United States Patent
Mano

(10) Patent No.: US 6,778,586 B1
(45) Date of Patent: Aug. 17, 2004

(54) RADIO COMMUNICATION EQUIPMENT AND COMMUNICATION METHOD

(75) Inventor: Hiroshi Mano, Hohya (JP)

(73) Assignee: Root, Inc., Tokyo (JP)

( * ) Notice: Subject to any disclaimer, the term of this patent is extended or adjusted under 35 U.S.C. 154(b) by 0 days.

(21) Appl. No.: 09/622,432

(22) PCT Filed: Feb. 17, 1998

(86) PCT No.: PCT/JP98/00631

§ 371 (c)(1),
(2), (4) Date: Aug. 16, 2000

(87) PCT Pub. No.: WO99/41867

PCT Pub. Date: Aug. 19, 1999

(51) Int. Cl.[7] .............................................. H04B 1/69
(52) U.S. Cl. ........................ 375/130; 375/134; 375/141; 375/143; 375/149
(58) Field of Search ................................. 375/130, 133, 375/134, 135, 136, 137, 140, 141, 143, 146, 148, 149, 152; 370/423, 470, 514

(56) References Cited

U.S. PATENT DOCUMENTS 5,105,436 A * 4/1992 Mori et al. .................. 375/149
5,930,290 A * 7/1999 Zhou et al. .................. 375/143
6,618,459 B1 * 9/2003 Tada ........................... 375/376

* cited by examiner

Primary Examiner—Shuwang Liu
(74) Attorney, Agent, or Firm—Fulwider Patton Lee & Utecht, LLP

(57) ABSTRACT

The radio communication apparatus (10) comprises a buffer (14) which temporarily stores data to be sent, a transmission/receiving circuit (12) having a data transmission circuit (30) and a data receiving circuit (40). The data transmission circuit (30) includes an input processor (41) which generates, when transmitting the data, a preamble to output it to a QPSK modulator (42), thereafter reads from the buffer (14) a data row of 256 bits and outputs it to the QPSK modulator (42). Accordingly, the transmission circuit (30) is constituted such that the data sets each including the preamble and the data row are repeatedly transmitted. On the other hand, the receiving circuit (40) includes a DMF (86) which accomplishes acquisition using a portion in the received data corresponding to the preamble.

14 Claims, 14 Drawing Sheets

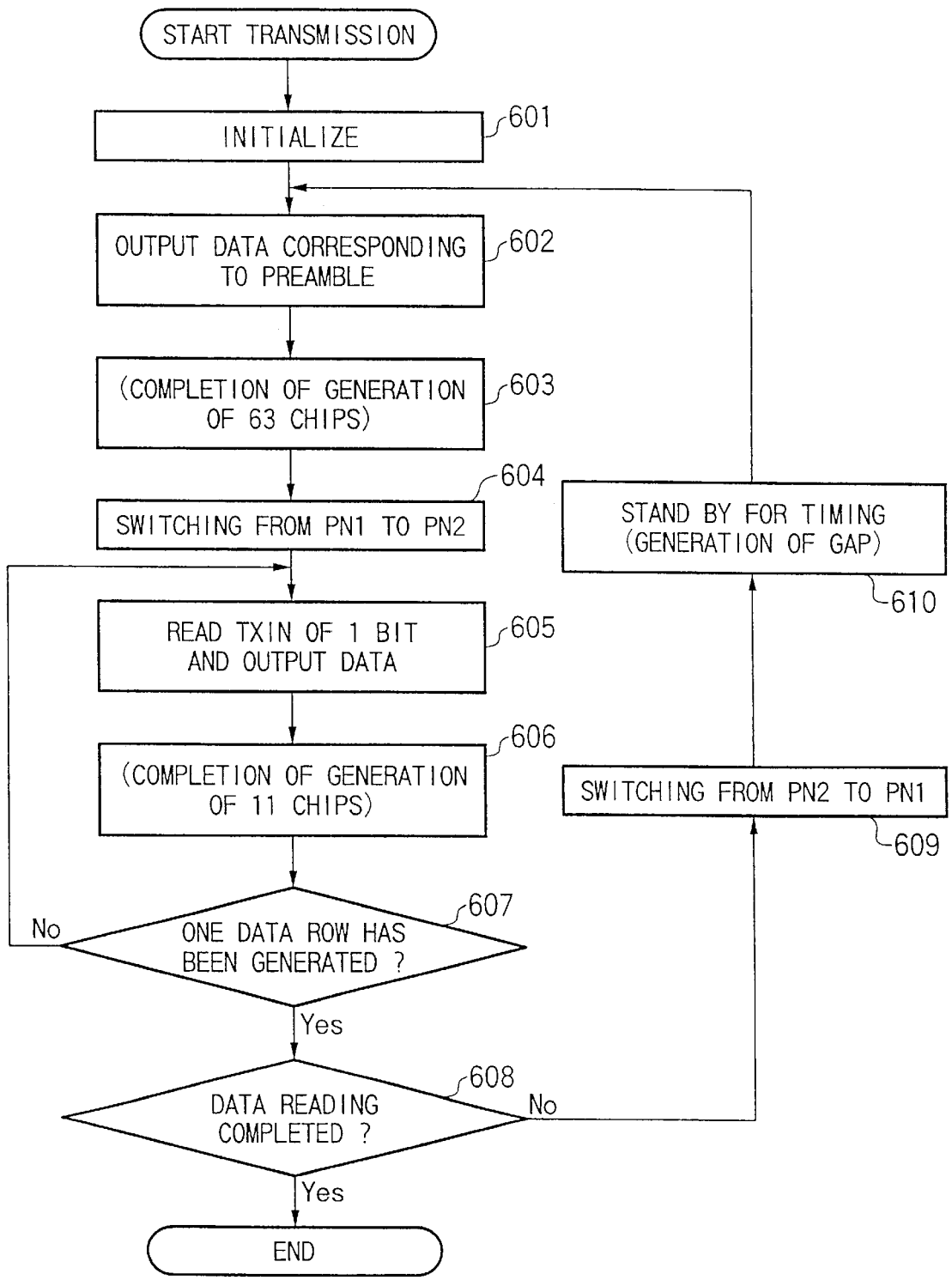

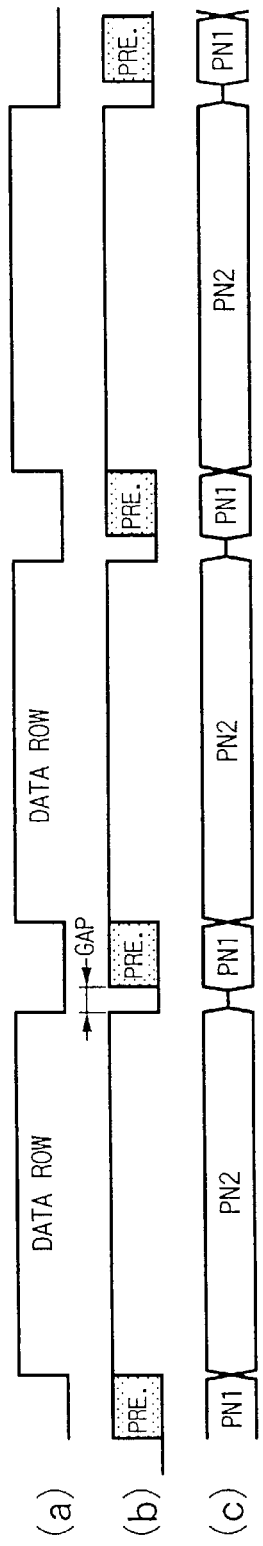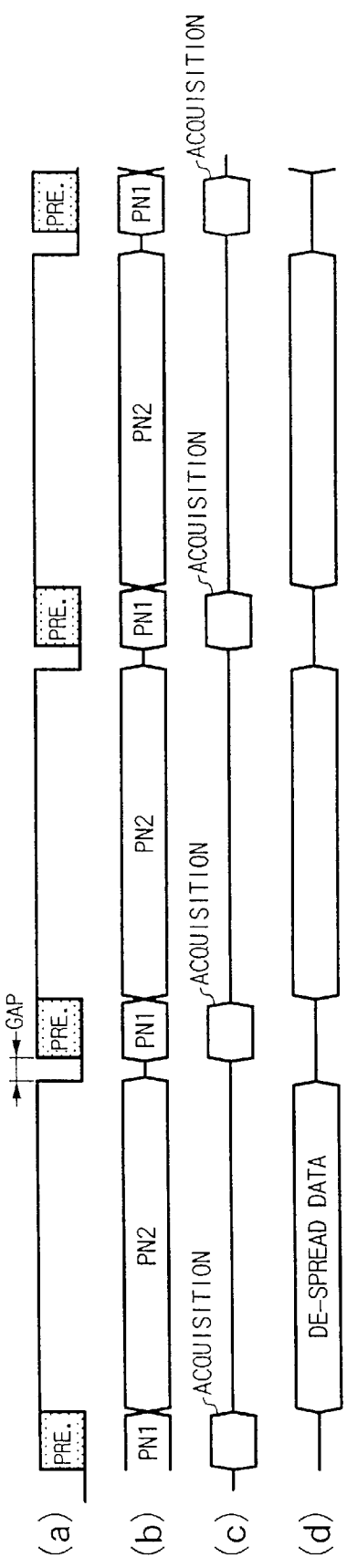

RADIO COMMUNICATION EQUIPMENT AND COMMUNICATION METHOD

FIELD OF INVENTION

This invention relates to a data transmitting/receiving apparatus, and more specifically, to a radio communication apparatus and a radio communication method which can transfer data at high-speed using simple circuitry.

BACKGROUND OF THE INVENTION

Recently, communication methods using spread spectrum (SS) techniques in which the band range of a modulated signal is made significantly wider than that of the signal using narrow-band modulation have been utilized in the field of radio communication such as mobile communication. This is because the communication methods using the spread spectrum techniques are characterized by (1) resistance to jam, (2) resistance to interference, (3) strong security and the like. Direct Sequence (DS) and Frequency Hopping (FH) are well known as methods for generating a spread signal by use of the spread spectrum. In the Direct Sequence method, for example, the spectrum of a signal to be transmitted is spread by use of pseudo-random codes named spreading code (Pseudo-random Noise (PN) code).

In the spread spectrum communication method using the spreading code, data to be transmitted are subjected to primary ($1^{st}$) modulation and then to secondary ($2^{nd}$) modulation. The modulated signal is then transmitted from an antenna. On the other hand, a signal received by the antenna is subjected to de-spreading and demodulation, whereby the data are restored. For accomplishing the above mentioned primary modulation, Phase Shift Keying (PSK), Differentially encoded PSK (DPSK), Quadrature PSK (QPSK) or the like is utilized, thereby multiplying the primarily modulated digital signal by the PN code series to obtain the spread signal. On the other hand, the signal received by the antenna on the receiving side is multiplied by the PN code series.

In the spread spectrum communication method, as mentioned above, the band range of the modulated signal is significantly larger than that of the signal using the narrow-modulation, and therefore, the S/N ratio on the front end of the receiving side is quite low. Accordingly, it is not easy to detect and decode the signal. In addition to this problem, a timing for generating the PN code at the receiving side is different from a timing for generating the PN code at the transmitting side. Accordingly a receiving circuit which accomplishes the above mentioned method is provided with special circuitry to execute two processing operations, namely acquisition and tracking, so as to suitably receive the signal and recognize what the signal means correctly.

For accomplishing this, the front portion of the data series to be transmitted (the header) is provided with a special signal (preamble) for the acquisition. Also, the conventional receiving circuit includes a digital matched filter (DMF) to execute the acquisition, while it executes the tracking by sampling the output from the DMF at a higher frequency than a spreading ratio and reviewing the adjacent peaks output from the matched filter so as to adjust the next sample timing.

In this way, the conventional receiving circuit includes dedicated circuits for the acquisition (such as DMF) and tracking. These dedicated circuits are complicated, which means that the communication apparatus has to be large-scaled. Further, if the wave strength is lowered when receiving a data series, it may be impossible to accomplish the acquisition. In this case, it is impossible to receive the signal suitably until the acquisition is again executed by use of the preamble in the following data series.

Incidentally, the aspect in which a plurality of users use a common band is called multiple access. As multiple access methods, there are known Frequency Division Multiple Access (FDMA) which uses distinct frequencies (communication channels) for every user, Time Division Multiple Access (TDMA) which uses the same frequency but assigns distinct time slots for every user, and Code Division Multiple Access (CDMA) which uses the spreading code.

In TDMA, since a radio communication apparatus is assigned to a time slot, the radio communication apparatus transmits a necessary signal in the assigned time slot, while another radio communication apparatus at the receiving side receives the signal transmitted in the assigned time slot. Accordingly, it is necessary to manage time information when using the TDMA. A conventional communication system is provided with a base station as well as radio communication apparatuses (slave stations), and the base station transmits the time information to each radio communication apparatus thereby adjusting transmitting/receiving timing of each radio communication apparatus. Alternatively, each radio communication apparatus may comprise a timer keeping the same time, and transmit the prescribed signal in its own assigned time slot based on the timer.

In the former, however, it is necessary to provide a separate base station capable of communication to each radio communication apparatus (slave station). Further since it is difficult to increase the number of slave stations, the system becomes restricted or inflexible. In addition thereto, if one base station can not transmit the time information to all radio communication apparatuses (slave stations), it is impossible to make use of the communication system unless another base stations are provided. On the other hand, since the speed at which a signal propagates through a transmission path has recently become very high (e.g. 2~5 Mbps), in the latter it is actually impossible to adjust the timer so as to keep the same time in each radio apparatus.

In view of the above, the object of the present invention is to provide a radio communication apparatus having simple circuitry and capable of accomplishing suitable synchronization, and a transmitter and a receiver constituting the radio communication apparatus.

Another object of the present invention is to provide a communication system using TDMA in which the communication apparatuses can suitably communicate with each other without providing a dedicated base station.

SUMMARY OF THE INVENTION

The above mentioned and other objects of the present invention are accomplished by a radio communication apparatus using spectrum spread, comprising a transmission circuit which generates modulated signals by use of primary modulation and spreading of data to be sent, and a receiving circuit which obtains data by use of de-spreading and demodulation of received signals, the apparatus comprising a data divider which divides the data to be sent into a plurality of data rows each having a prescribed length, and a data generator which receives the data rows and generates data sets each including a prescribed preamble and the data row, wherein the transmission circuit repeatedly transmits the data sets each including the preamble and data row, and wherein the receiving circuit receives the data sets and captures a portion of the received signal which corresponds to the preamble to accomplish acquisition.

The above mentioned and other objects of the present invention are also accomplished by a radio communication apparatus using spectrum spread and comprising a transmission circuit including a primary modulator which subjects data to be sent to primary modulation and a spread circuit which subjects the primarily modulated data to the spectrum spread so as to generate and transmit modulated signals, and a receiving circuit which subjects received signals to de-spreading and demodulation so as to restore data, the apparatus comprising a buffer which temporarily stores the data to be sent, and input processor which generates a preamble and outputs it to the primary modulator, and thereafter, reads from the buffer a data row having a prescribed length and outputs it to the primary modulator, wherein the transmission circuit repeatedly transmits data sets each including the preamble and the data row supplied from the input processor, and wherein the receiving circuit receives the data sets and captures a portion of the received signal which corresponds to the preamble to accomplish acquisition.

According to the present invention, the transmission circuit repeatedly transmits the data sets each including a portion corresponding to the preamble and another portion corresponding to the data row, while the receiving circuit accomplishes the acquisition using the repeatedly supplied portion corresponding to the preamble. Accordingly, since the acquisition is executed at a prescribed interval, it is possible to appropriately receive the data body and restore it without executing symbol tracking.

In a preferred aspect of the present invention, the prescribed length of the data row is determined based on an error between a clock speed or clock frequency used in the transmission circuit and another clock speed or clock frequency which is expected to be used in a destination receiving circuit. More preferably, the prescribed length of the data row is equal to or less than $Tsyn/(2 \cdot dT)$, wherein $dT=|1/Ftx-1/Frx|$, $Tsyn=1/Ftx$, $Ftx$ is a clock frequency used in the transmission circuit, and $Frx$ is a clock frequency expected to be used in the destination receiving circuit. According to this aspect, at the destination side, the appropriate acquisition can be accomplished, at least preventing errors in data interpretation owing to the margin of error between the clocks of the transmission and receiving sides.

Besides, the above mentioned and other objects of the present invention are accomplished by a transmission apparatus corresponding to the above mentioned transmission circuit or a receiving apparatus corresponding to the above mentioned receiving circuit, or a transmission method corresponding to an operation of the transmission circuit or a receiving method corresponding to an operation of the above mentioned receiving circuit.

Furthermore, the objects of the present invention are accomplished by a radio communication apparatus which transmits and receives data in one or more time slots using TDMA, comprising a first time slot number obtaining circuit which receives signals and, based thereon, obtains at least one time slot number which is used by another station which is communicating with yet another, a timer which measures a time concerning the time slot; and a transmission time calculation circuit which calculates a starting time of its own time slot based on the obtained time slot number and the time, wherein the apparatus transmits its own time slot number and the data to be sent at the calculated starting time.

According to this aspect, based on the time slot number and its time information (e.g. starting time) concerning the other station, the starting time of its own time slot is calculated in a reverse manner. Accordingly, without providing a base station for managing time or keeping the same time among the radio communication stations, it is possible to appropriately transmit signals in the own slot.

The time slot may be assigned in advance or may be dynamically assigned by searching for vacant slots. In the latter, it is preferable to provide the apparatus with a vacant slot detector which finds out at least one vacant slot number based on the obtained slot number to select its own slot number from among the found vacant slot numbers.

In a further preferable aspect of the present invention, the apparatus further comprises a primary map which stores a first list indicative of time slot numbers of other stations which are communicating with another, and a secondary map which stores a second list indicative of time slot numbers used by secondary stations, the secondary stations being further stations which the other stations recognize as being communicating, and the time slot numbers of secondary stations being obtained and transmitted to the apparatus by the other stations, wherein the vacant slot detector finds out the vacant slot number based on the first and second lists in the primary and secondary maps.

According to this aspect, the apparatus can find out the time slot numbers used by the further stations which the apparatus itself can not directly communicate with. In view of this, it is possible to prevent collision owing to interference of the time slot with other stations.

In order to prevent the above mentioned collision, the radio communication apparatus may further comprise a tertiary map which stores a third list indicative of time slot numbers used by tertiary stations, the tertiary stations being still further stations which the secondary stations recognize as being communicating, and the time slot numbers of third stations being obtained and transmitted to the apparatus by the secondary stations via the other stations, wherein the vacant slot detector finds out the vacant slot number based on the first, second and third lists in the primary, secondary and tertiary maps. The above objects are accomplished by a radio communication method comprising the above mentioned features.

Furthermore, the present invention can provide a digital cord-less telephone apparatus comprising radio communication apparatuses using the above mentioned TDMA method.

BRIEF DESCRIPTION OF THE DRAWINGS

FIG. 6 is a flowchart showing processing operations mainly executed by an input processor of a transmission circuit according to a second embodiment of the present invention;

FIG. 7 is a timing chart showing a variety of signals in the transmission circuit according to the second embodiment;

FIG. 8 is a timing chart showing variety of signals in a receiving circuit according to the second embodiment;

DESCRIPTION OF THE PREFERRED EMBODIMENT

Figure 1:
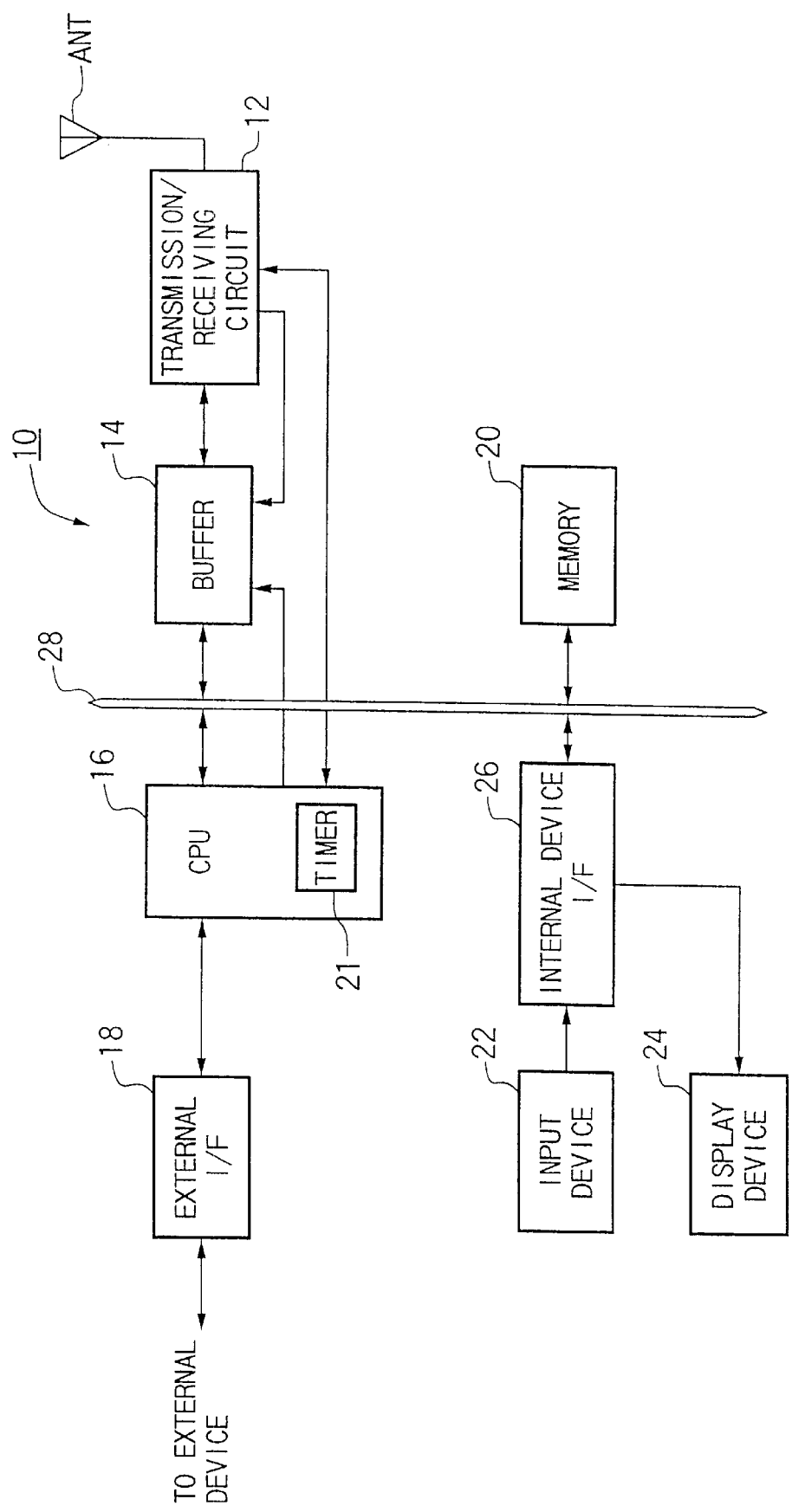
FIG. 1 is a block diagram of data communication apparatus according to a first embodiment of the present invention.

The embodiments of the present invention will be now explained with reference to the accompanying drawings. FIG. 1 is a block diagram showing hardware of a radio communication apparatus according to a first embodiment of the present invention. As shown in FIG. 1, the radio communication apparatus 10 comprises a transmitting/receiving circuit 12 which receives a signal from an antenna and transmits a signal via the antenna, a buffer 14 which temporally stores data to be supplied to the transmitting/receiving circuit 12 or data received by the transmitting/receiving circuit 12 and subjected to prescribed processing operations, a central processing unit (CPU) which controls the whole radio communication apparatus 10, and external device interface (I/F) 18 which controls communication with external devices (e.g. personal computers), a memory 20 including a read only member (ROM) storing programs of processing operations executed by the CPU 16 and a random access memory (RAM) used as a work area and a data storage area during computation, an input device 22 constituted by switches and keys, a display device constituted by light emitting diodes (LED) or a liquid crystal display (LCD), and an internal device I/F 26 which controls the communication with the CPU 16 and the like. The buffer 14, CPU 16, memory 20 and internal device I/F 26 are connected with each other via a data bus 28.

In accordance with instructions from the CPU 16, the buffer 14 receives data to be sent, which are supplied from the external device (not shown) via the external device I/F 18 and/or are stored in the memory 20, and temporally stores them. The data "TXIN" to be sent temporally stored in the buffer 14 are output to the transmitting/receiving circuit 12 at a prescribed timing. Also, the buffer temporally stores the received data "RXOUT" output from the transmitting/receiving circuit 12. The CPU 16 executes control operations of the input device 22 and display device 24, and those of the external I/F 18 and the like, in accordance with the program stored in the ROM of memory 20. In addition, the CPU 16 supplies control signals to the transmitting/receiving circuit 12 at prescribed timing by referring to a built-in timer 21, and controls the timing of later described de-spreading and the like.

Figure 2:
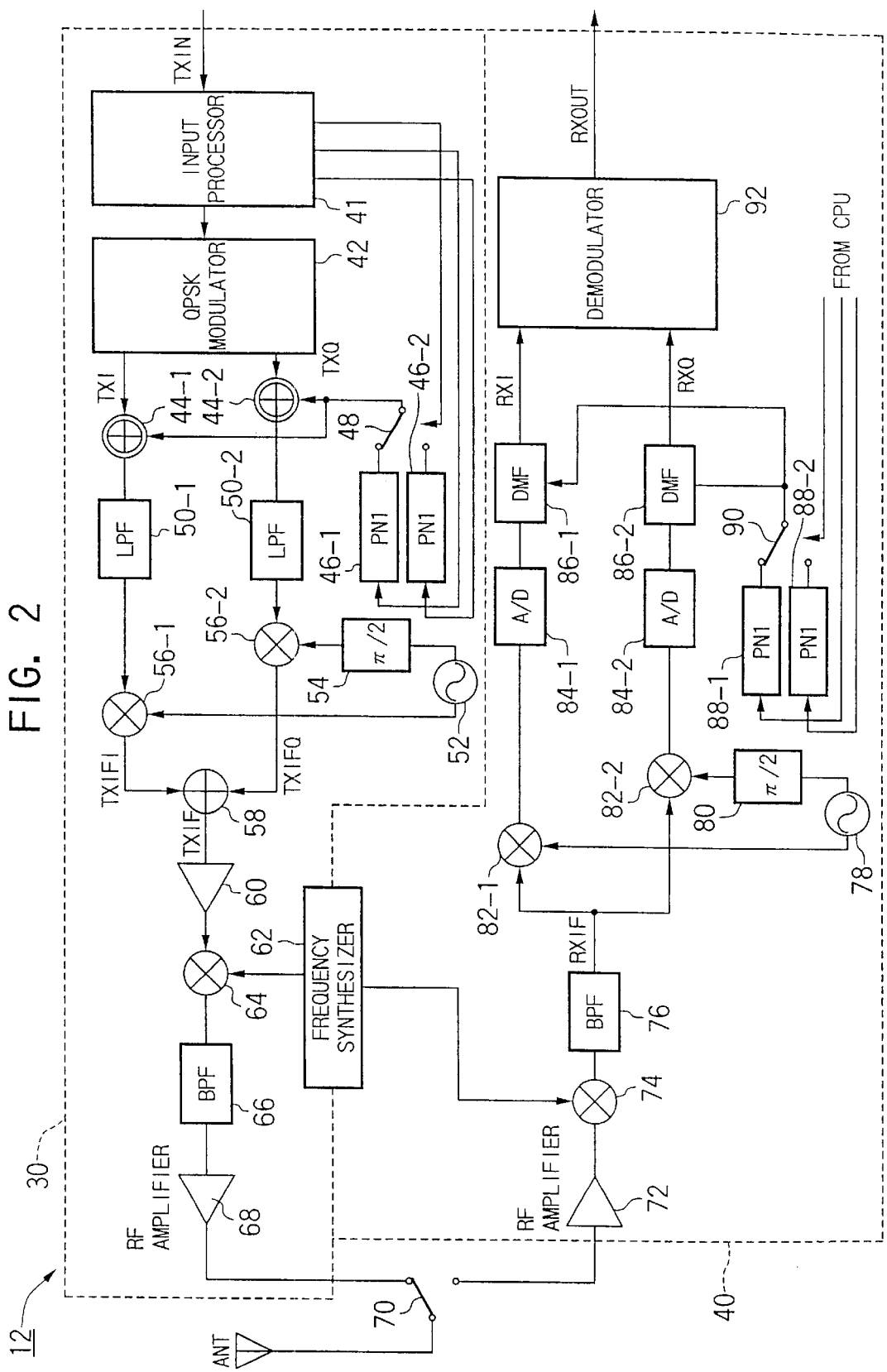
FIG. 2 is a block diagram of a transmitting/receiving apparatus according to the first embodiment of the present invention.

FIG. 2 is a block diagram showing the transmitting/receiving apparatus 12 in detail. As shown in FIG. 2, the transmitting/receiving apparatus generally comprises a transmission circuit 30 and a receiving circuit 40.

The transmission circuit 30 comprises an input processor 41 which receives the data to be sent (TXIN) from the buffer and adds a necessary preamble thereto, a QPSK modulator (or a differential encoder) which subjects the output from the input processor 41 to primary or first modulation (QPSK modulation) to obtain an in-phase component (I signal) "TXI" and a quadrature component (Q signal) "TXQ" of a base band, spread circuits 44-1 and 44-2 which spread (secondarily modulate) the I and Q signals, respectively, first and second code generators 46-1 and 46-2 which output first and second spreading codes (PN1 and PN2), respectively, a switch 48 which selects one of the code generators, low-pass filters (LPF) 50-1 and 50-2, a local oscillator 52 which generates a signal of prescribed frequency in order to obtain an intermediate frequency signal (IF signal), a phase shifter which shifts the phase of a carrier wave from the local oscillator 52 by $\pi/2$, multipliers 56-1 and 56-2, an adder 58 which adds the secondarily modulated I and Q signals and obtains an IF signal, an amplifier 60, a frequency synthesizer 62 which generates a signal of a particular frequency, a multiplier 64 which multiplies the IF signal and a carrier wave from the frequency synthesizer 62 together, a band-pass filter (BPF) 66, and an RF amplifier 68.

The receiving circuit 40 comprises an RF amplifier 72, a multiplier 74, a BPF 76, a local oscillator 78, a phase shifter 80, multipliers 82-1 and 82-2 which multiply carrier waves from the local oscillator 78 and output from the BPF 76 together and obtain an In-phase component (I signal) and a quadrature component (Q signal), respectively, analogue-to-digital (A/D) converters 84-1 and 84-2, digital matched filters (DMF) 86-1 and 86-2, third and fourth code generators 88-1 and 88-2 which output first and second spreading codes (PN1 and PN2) in order to accomplish de-spreading in the DMFs 86-1 and 86-2, respectively, a switch 90 which selects one of the code generators, and a demodulator (or a differential decoder) 92 which receives the de-spreading I and Q signals obtained by the DMFs 86-1 and 86-2 and demodulates them.

Figure 3:
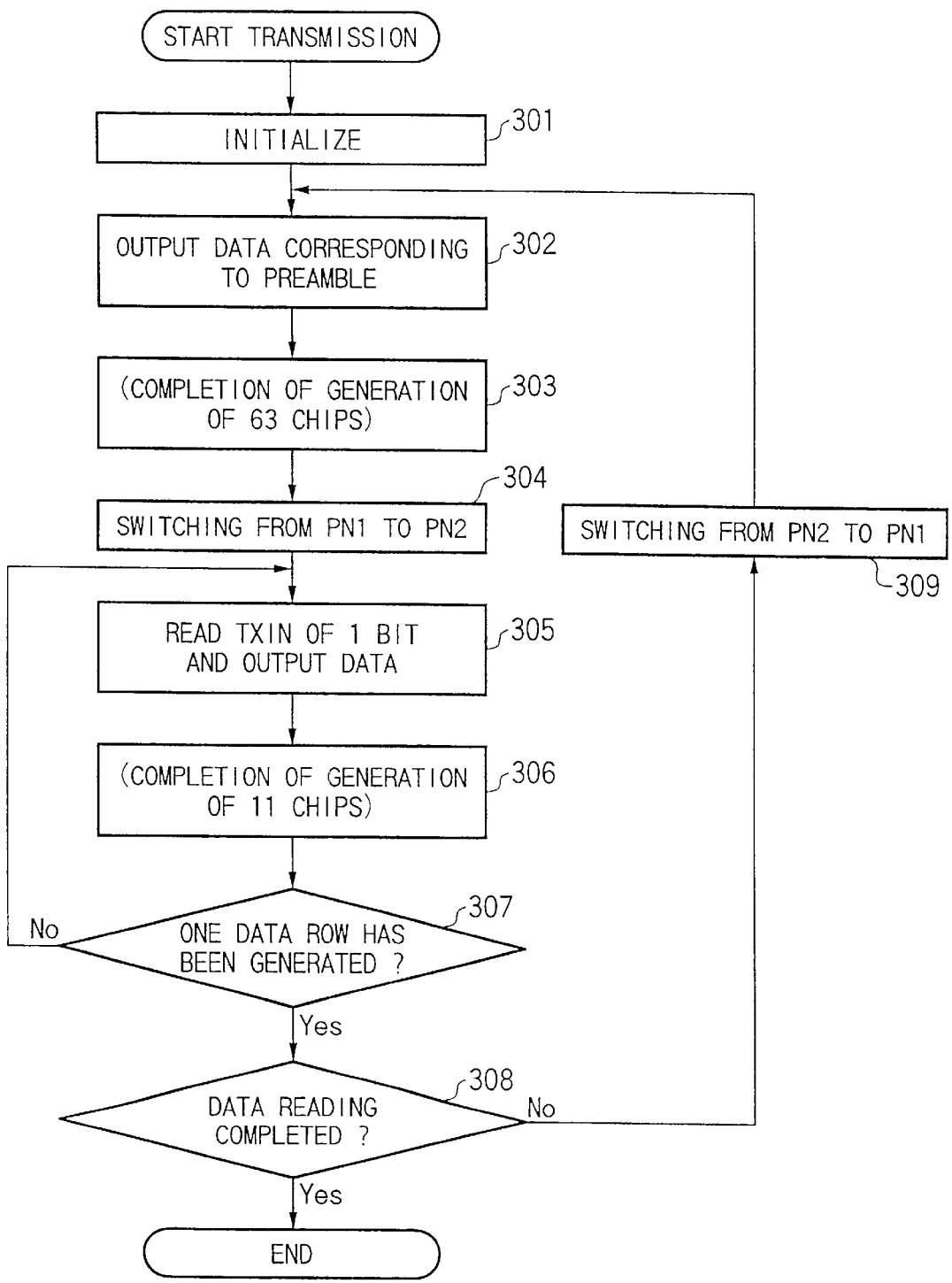
FIG. 3 is a general flowchart showing processing operations mainly executed by an input processor of a transmission circuit according to the embodiment.

The switch 70 accomplishes the switching between the transmission circuit 30 and receiving circuit 40. In the thus constructed transmitting/receiving circuit 12 of the radio communication apparatus, the operation of the transmission circuit 30 will be now explained. FIG. 3 is a general flowchart showing the processing operations executed by the input processor 41 and the like of the transmission circuit 30. In this embodiment, the input processor 41 can read data from the buffer 14 and output them, as well as generate preambles of prescribed length (time length) and output them.

First, the CPU 16 transfers to the buffer 14 data to be sent which are stored in the memory 20 or supplied from the external device via the external I/F, and thereafter provides the input processor 41 of the transmitting/receiving circuit with an instruction indicative of the beginning of transmission. As shown in FIG. 3, when the input processor 41 receives the beginning of transmission from the CPU 16, it executes an initial operation (Step 301). In this operation, the switch 48 is set so as to connect the first code generator 46-1 with the spread circuits 44-1 and 44-2. Then, the input processor 41 outputs data corresponding to the preamble to the QPSK modulator 42 (Step 302).

In this embodiment, the input processor 41 outputs a signal indicative of "1" or "0" of a length corresponding to 63 chip durations. After each of the spread circuits 44-1 and 44-2 obtains spreading codes of the particular length (e.g. 63 chips) (Step 303), the input processor 41 controls the switch 48 to connect the second code generator 46-2 with the spread circuits 44-1 and 44-2 (Step 304).

Then, the input processor 41 reads data to be sent "TXIN" of 1 bit from the buffer, and outputs them to the QPSK modulator 42 at a prescribed timing (Step 305). After each of the spread circuits 44-1 and 44-2 obtains spreading codes of a particular chip length (e.g. 11 chips) (Step 306), the input processor 41 determines whether or not the data to be sent "TXIN" of a prescribed length (or prescribed bits) have been read (Step 307). This data length will be explained in detail later. If the result is "No" at Step 307, the processing operation returns to Step 305. Conversely, if the result is "Yes" at Step 307, the processing operation proceeds to Step 308. At Step 308, the input processor 41 determines whether or not all of the data to be sent "TXIN" have been read out. If the all data have been read ("Yes" at Step 308), the processing operation terminates. Conversely, if remaining data exists ("No" at Step 308), the input processor 41 controls switch 48 to connect the first code generator 46-1 with the spread circuits 44-1 and 44-2 (Step 309), and thus the processing operation returns to Step 302.

Figure 4:
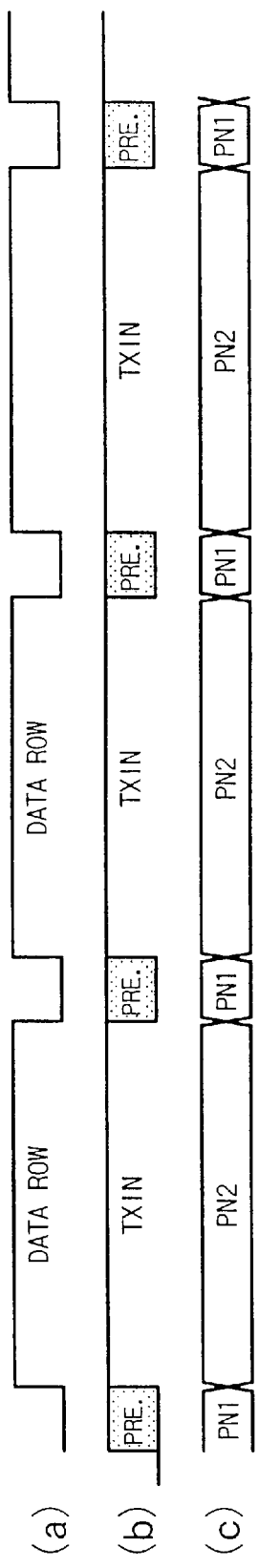
FIG. 4 is a timing chart showing a variety of signals in the transmission circuit according to the embodiment.

In view of the above, the completion of the above mentioned processing operation enables generation of signals in which a preamble is inserted into each data row of the prescribed length. FIG. 4(a) shows the data to be sent "TXIN" read out by the input processor 41, FIG. 4(b) shows the output from the input processor 41, and FIG. 4(c) shows the kind of spreading code applied to the I and Q signals. In FIG. 4(a), according to this embodiment, the data row is formed of data to be sent "TXIN" of 256 its (128 symbols after the QPSK modulation). As shown in FIG. 4(b), the preamble "PRE" is inserted between the adjacent data rows.

The preamble "PRE" and data row (data to be sent) "TXIN" output from the input processor 41 based on the processing operation shown in FIG. 3 are subjected to the primary or first modulation in the QPSK modulator 42 whereby the I and Q signals of base band are generated. The I and Q signals are spread using one of the codes PN1 and PN2. The spread I and Q signals pass through the respective LPFs 50-1 and 50-2, which limits the band. Then, the I and Q signals are supplied to the respective multipliers 56-1 and 56-2 and multiplied by the carrier wave from the local oscillator 52. In this regard, the carrier wave whose phase is shifted by $\pi/2$ (90°), which is accomplished by the phase shifter 54, is applied to the multiplier 56-2. The adder 58 adds the outputs from the multipliers 56-1 and 56-2, thus obtaining the intermediate frequency signal "TXUF". The intermediate frequency signal "TMF" passes through the amplifier 60 and is then supplied to the multiplier 64. The multiplier 64 multiplies the "TXIF" by the carrier wave output from the frequency synthesizer 62. Further, the signal output from the multiplier 64 passes through the BPF 66, RF amplifier 68 and switch 70, and is output from the antenna ANT as the transmission signal.

On the other hand, the receive signal received by the antenna ANT is supplied to the RF amplifier 27 of the receiving circuit 40 via the switch 70. The output signal from the RF amplifier is multiplied by the carrier wave from the frequency synthesizer 62 in the multiplier 74, and is then subjected to band limiting by the BPF 76. The intermediate frequency signal "RXIF" output from the BPF 76 is separated into two signals which are supplied to respective multipliers 82-1 and 82-2. The multiplier 82-1 is provided with the carrier wave from the local oscillator 78, whereas the multiplier 82-2 is provided with the carrier wave whose phase is shifted by $\pi/2$, which is accomplished by phase shifter 80. Accordingly, the multipliers 82-1 and 82-2 accomplish the orthogonal detection and respectively output an I signal "RXIFI" and a Q signal "RXIFQ" of intermediate frequency. The I and Q signals are converted into digital signals by the respective A/D converters 84-1 and 84-2. The two sets of digitzed data are then supplied to the respective DMFs 86-1 and 86-2.

The DMFs 86-1 and 86-2 accomplish acquisition and de-spreading using one of the codes PN1 and PN2 at a necessary timing. As mentioned above, According to this embodiment, the transmission signal is constituted such that the data set consists of the preamble and data row of the prescribed length, and the former is subjected to spreading using the code PN1 whereas the latter is subjected to spreading using the code PN2. In view of the above, when receiving the data, the CPU 20 (see FIG. 1) first controls the switch 90 to connect the third code generator 88-1 which generates the first code (PN1) with each DMF 86-1, 86-2. Accordingly, each of the DMFs 86-1 and 86-2 calculates a correlation value between the received signal of a prescribed chip number (e.g. 63 chips) corresponding to the preamble and the first code (PN1) to accomplish the acquisition.

After completing the acquisition, when the DMFs 86-1 and 86-2 receive the spread data corresponding to the data row of the prescribed length (i.e. data body), the CPU 20 controls the switch 90 to connect the fourth code generator 88-2 which generates the second code (PN2) with each DMF 86-1, 86-2. As a result, the de-spreading of data corresponding to the data row is accomplished and the de-spread data (RXI and RXQ) are output from the respective DMFs 86-1 and 86-2.

In this embodiment, since the data set constituted by the preamble and data row of the prescribed length repeats, the CPU 20, every time the preamble arrives, controls the switch 90 to connect the code generator 88-1 which generates the first code (PN1) with each DMF 86-1, 86-2, thereby accomplishing the acquisition using the DMFs 86-1 and 86-2. By repeating these processing operations, the acquisition and generation of the de-spread data are accomplished as shown in the timing chart of FIG. 5. Herein, FIG. 5(a) schematically shows data supplied to the DMF, FIG. 5(b) shows the kind of spreading code applied to the DMF, FIG. 5(c) shows the timing of acquisition, and FIG. 5(d) shows the timing for obtaining the de-spread data.

Figure 5:
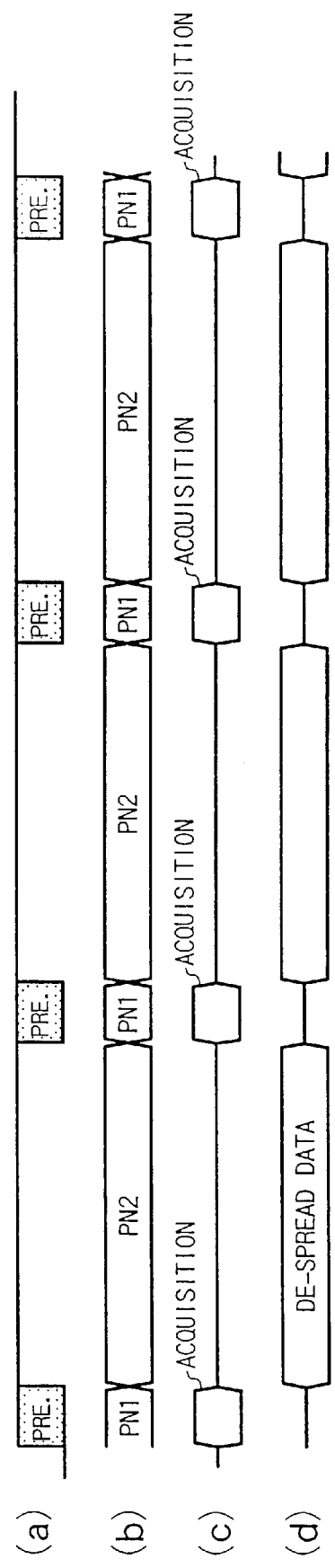
FIG. 5 is a timing chart showing variety of signals in a receiving circuit according to the embodiment.

As shown in FIG. 5, according to this embodiment, the acquisition is accomplished using the data portion corresponding to the preamble. On the other hand, symbol tracking which is usually executed after the acquisition is omitted. This is because the transmit data is constituted such that the data set consisting of the preamble and data row repeats, and therefore, so far as the acquisition is executed for every arrival of a data portion corresponding to the preamble, the symbol tracking does not need to be carried out.

This point will now be explained more specifically. Suppose that the radio communication apparatus on the transmission side transmits data using a clock of a particular frequency "Ftx", whereas the radio communication apparatus on the receiving side (the destination side) receives data using a clock of a particular frequency "Frx". If the frequency "Ftx" does not coincide with the frequency "Frx", even though the transmission side is initially synchronous with the receiving side, the sampling points of the former gradually deviate from those of the latter. This timing lag can be expressed as $dT=|1/Ftx-1/Frx|$. Now suppose that the data rate to be sent is Tsyn (=1/Ftx). As long as the amount of data N (bits), which is continuously sent, does not exceed Tsyn/(2•dT), no data transmission error occurs. For example, if Ftx equals 900/899•Frx and dT equals (1/899)•(1/Ftx), Tsyn/(2•dT) equals 449.5. So long as the data length to be sent is equal to or less than 449 bits, no data transmission error occurs regardless of the fact that the symbol tracking is omitted.

Furthermore, according to this embodiment, so-called carrier tracking can be omitted, which is usually accomplishd using an oscillator positioned upstream of the DMF and a multiplier which multiplies the input signal by a signal from the oscillator.

The de-spread data shown in FIG. 5(d) is then supplied to the demodulator. The demodulator demodulates (or decodes) the data (corresponding to the I and Q signals of base band) to obtain the received data "RXOUT" and store them in a prescribed area of the buffer 14 (see FIG. 1). The data receiving is thus completed. The CPU 20 reads the received data from the buffer 14 to store them in the prescribed area of the memory 20, display the image based thereon or output them to the external device via the external I/F 18.

According to this embodiment, the transmission circuit transmits the transmission signal in such a form that the data set consisting of the preamble and data row of the prescribed length repeats, and the receiving circuit accomplishes the acquisition using the data portion corresponding to the preamble. Sine the data portion corresponding thereto can be periodically received, it is possible to periodically execute the acquisition. Consequently, it is possible to suitably receive the signals and interpret then without executing the symbol tracking when receiving the data body (the portion corresponding to the data row).

Besides, the data portion corresponding to the preamble is periodically received, which enables the acquisition to be periodically executed. Accordingly, even if the receiving condition of radio wave changes when receiving the signal (e.g. deterioration of radio wave strength), it is possible to minimize the suspension of data receiving because the acquisition can be executed using the following data portion corresponding to the preamble.

A radio communication apparatus according to the second embodiment of the present invention will now be explained. The features and components of the radio communication apparatus and transmitting/receiving apparatus according to this embodiment are substantially the same as those in the first embodiment. FIG. 6 is a flowchart showing the general processing operation of the input processor and the like in the transmission circuit 30 according to the second embodiment. As can be seen from FIG. 6, these processing operations are the same as those shown in FIG. 3 except for the addition of Step 601 to the latter. Steps 601 to 609 in FIG. 6 correspond to Steps 301 to 309 in FIG. 3, respectively. In these processing operations shown in FIG. 6, after Step 609 (switching of the switch 48), a time gap is generated as a stand-by for a prescribed time (Step 610). After Step 610, the processing operation returns to Step 302. According to these operations, as shown in a timing chart of FIG. 7(b), the time gap of the prescribed period is positioned between the data set consisting of the preamble and dat row of prescribed length and another data set. Accordingly, in the receiving circuit 40, the order of processing operations itself is the same as that of the first embodiment, but the timing of acquisition is different (see FIG. 8). FIG. 8(a) schematically shows the data supplied to the DMF, FIG. 8(b) shows the kind of spreading code applied to the DMF, FIG. 8(c) shows the timing of acquisition, and FIG. 8(d) shows the timing for obtaining the de-spread data. As shown in FIG. 8(a), the received data are constituted such that data sets each consisting of the portion corresponding to the preamble and another portion corresponding to the data row (i.e. data body) repeat, and the prescribed gap "GAP" is provided between the adjacent data sets. Accordingly, just like the first embodiment, it is possible to execute the acquisition for every arrival of the portion corresponding to the preamble (see FIG. 8(c)).

The radio communication apparatus according to one of first and second embodiments can be used in a communication system using FDMA, TDMA or CDMA such that a plurality of radio communication apparatuses share a common frequency band. For example, one aspect in which the above mentioned radio communication apparatus is used in a communication system using TDMA (third embodiment) will now be explained.

Figure 9A:
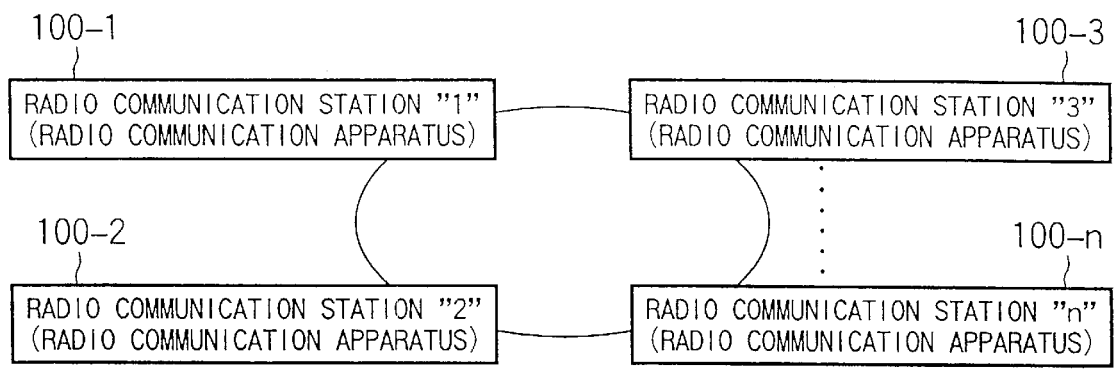
FIG. 9(a) is a block diagram of a radio communication system according to a third embodiment of the present invention and FIG. 9(b) is a timing chart generally showing time slots of respective radio communication stations (radio communication apparatuses)
Figure 9B:
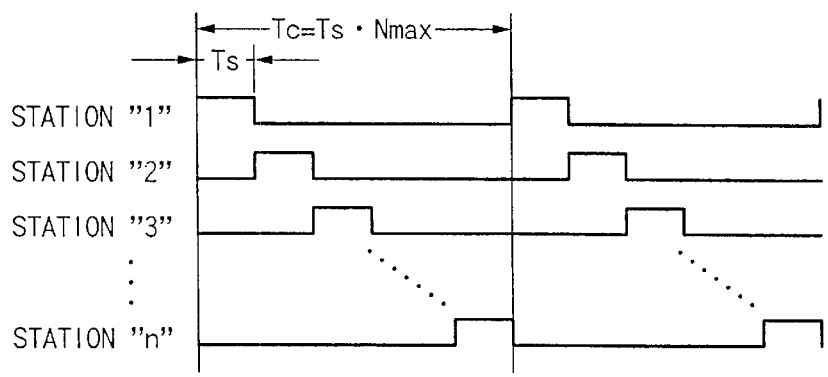

FIG. 9(a) is a schematic block diagram of the radio communication system according to the third embodiment of the present invention and FIG. 9(b) is a timing chart schematically showing time slots for the respective radio communication stations (radio communication apparatuses). As shown in FIG. 9(a), in this embodiment, "n" radio communication stations 100-1, 100-2, . . . , 100-n are connected with each other using a network NW, which constitutes the radio communication system. By adding later described features for accomplishing TDMA to the radio communication apparatus illustrated in the first or second embodiment, the apparatus can be used as the radio communication station. More specifically, it is accomplished in such a way that the memory 20 stores a later described program for TDMA therein and the CPU 20 executes processing operations based on the above program. Besides, in the third embodiment, it is assumed that an own slot number is assigned to each of the radio communication stations 100-1 to 100-n such that a particular slot number for one station is not duplicated. As shown in FIG. 9(b), a first time slot Ts1 is assigned to the first radio communication station (100-1), and the second tine slot Ts2 is assigned to the second radio communication station (100-2). Here, the number of radio communication stations "n" is equal to or less than the maximum slot number "Nmax". Further it is assumed that the radio communication stations 100-1 to 100-n can communicate with each other.

Figure 10:
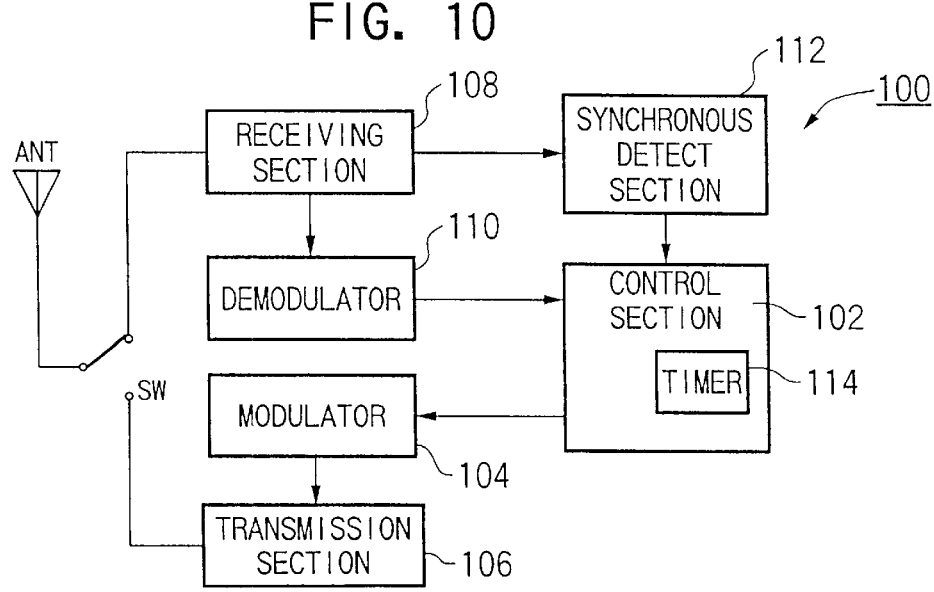
FIG. 10 is a block diagram of the radio communication station according to the third embodiment.

FIG. 10 is a block diagram showing features of each radio communication station according to the third embodiment. As shown in FIG. 10, the radio communication station 100 comprises an antenna "ANT", a control section 102, a modulator 104, a transmission section 106, a receiving section 108, a demodulator 110 and a synchronous detect section 112. The control section 102 is provided with a timer 114. In these features, the control section 102 substantially corresponds to the CPU 10 and the input processor 41 of the radio communication apparatus 10 shown in FIGS. 1 and 2, while the modulator 104 substantially corresponds to the QPSK modulator 42, spread circuit 44, code generators 46 and the like. The transmission section 106 substantially corresponds to various circuit elements from the local oscillator 52, phase shifter 54, multipliers 56-1 and 56-2 to the RF amplifier 68 shown in FIG. 2. Besides, the receiving section 108 substantially corresponds to various circuit elements from the RF amplifier 72 to the multiplier 82 in FIG. 2, and the demodulator 110 substantially corresponds to various circuit elements from the A/D converter 84 to demodulator (or decoder) 92. Furthermore, the function of the synchronous detect section 112 is mainly accomplished by the DMF 86 and the CPU 20.

Figure 11:
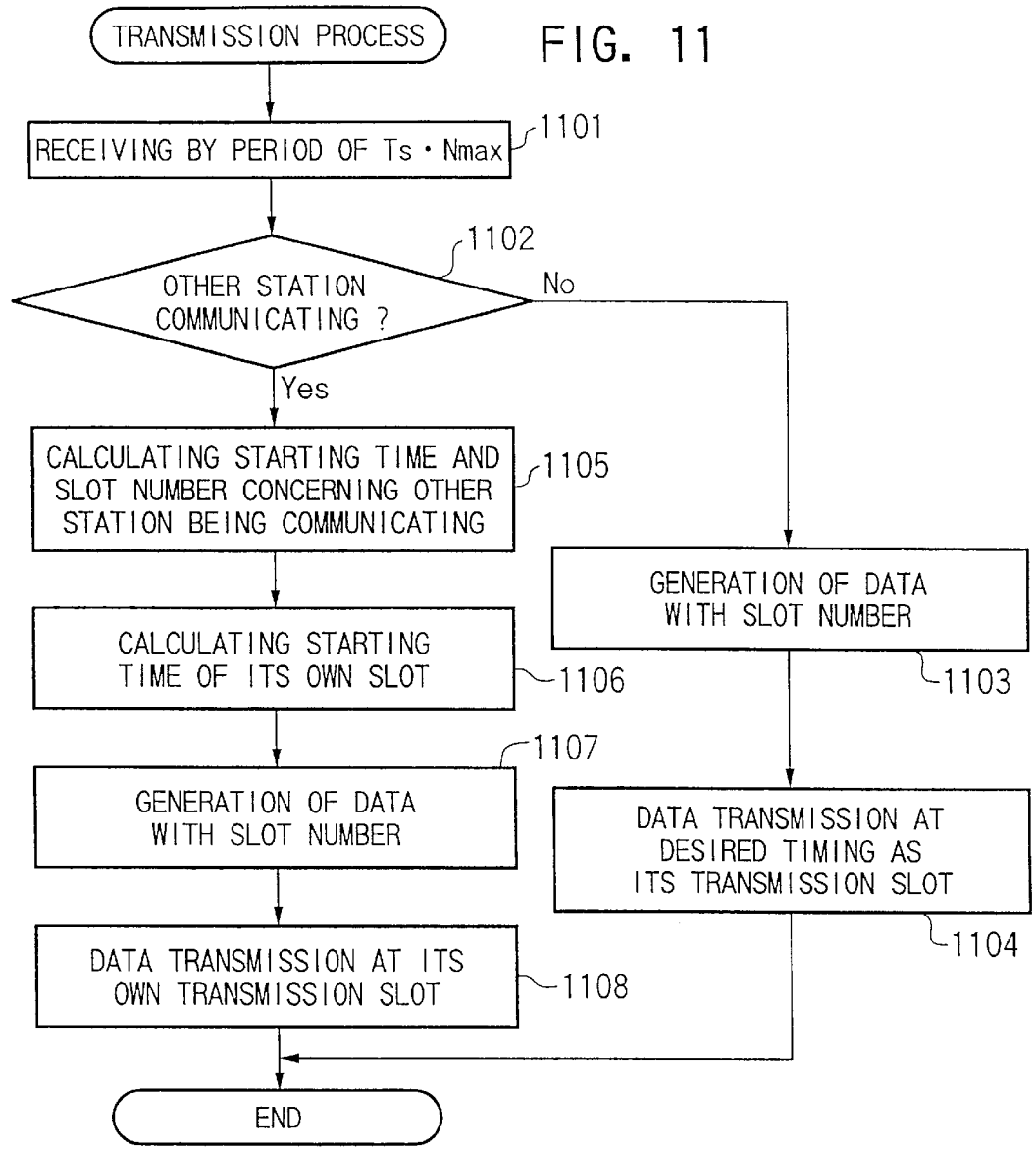
FIG. 11 is a flowchart showing transmission processing operations of the radio communication system according to the third embodiment.

The transmission process in the thus constituted radio communication station (e.g. 100-1) in the radio communication system will now be explained. FIG. 11 is a flowchart showing transmission processing operations of the radio communication station in the radio communication system according to the third embodiment. As shown in FIG. 11, first, the radio communication station receives a signal for a period of Tc=Ts•Nmax (Step 1101). This enables the radio communication station to find out whether or not any other radio communication station is communicating during one period "Tc". If the control section 102 of the radio communication station determines that no radio communication station is communicating ("No" at Step 1102), the control section 102 generates data to be sent to which the assigned own slot number is added (Step 1103). Then, the control section 102 sets a desired tine as a starting time of its slot and transmits the data to be sent generated at Step 1103 in the assigned slot "Ts" (Step 1104). In view of the above, the data to be sent to which the slot number is added are transmitted to the destination radio communication station every slot "Ts".

Conversely, if the control section 102 determines that any one of the other radio communication stations is communicating ("Yes" at Step 1102), it calculates the transmission starting time "Trs" of one of the other radio communication stations based on information supplied via the receiving section 108 and synchronous detect section 112 and a time according to the timer 114, and determines the slot number of the one radio communication station (Step 1105). Then, the control section 102 calculates a starting time of its own slot "Tts" along with the following equations.

If $Nt>Nr$, $Tts=(Nr-Nt)•Ts+Trs$ (1-1)

If $Nt<Nr$, $Tts=[(Nmax-Nr)•Nt]•Ts+Trs$ (1-2)

where "Nt" is the own slot number, "Nr" is the received slot number and "Trs" is the starting time concerning the received slot.

In this way, after the starting time concerning the own slot number while considering the relation to the slot of another station, the data to be sent to which the own slot number is added are generated (Step 1107). Then, the data to be sent generated at Step 1107 are transmitted at the own slot starting time "Tts" calculated at Step 1105 (Step 1108). According to this, the data to be sent, to which the slot number is added, are transmitted to the destination radio communication station every slot "Ts". As mentioned above, in this embodiment, if the radio communication station has to execute transmission, the station temporarily receives the signal for a period (Ts•Nmax) to determine whether or not any other radio communication station is communicating, and, if no station exists, a desired time is set as the starting time and data transmission is accomplished. On the other hand, if any station is communicating, it is possible to calculate the own slot starting time based on the other station's slot starting time and slot number. Because of this, according to this embodiment, it is possible to appropriately accomplish the communication using TDMA without providing a base station which transmits time information, or adjusting time among the radio communication stations.

A fourth embodiment of the present invention will now be explained. In this embodiment, the number of radio communication stations "n" is greater than the maximum slot number "Nmax", and a particular slot number is not assigned to each radio communication station. Except for the above mentioned point, the features of the communication system and each radio communication station are the same as those of the third embodiment.

Figure 12:
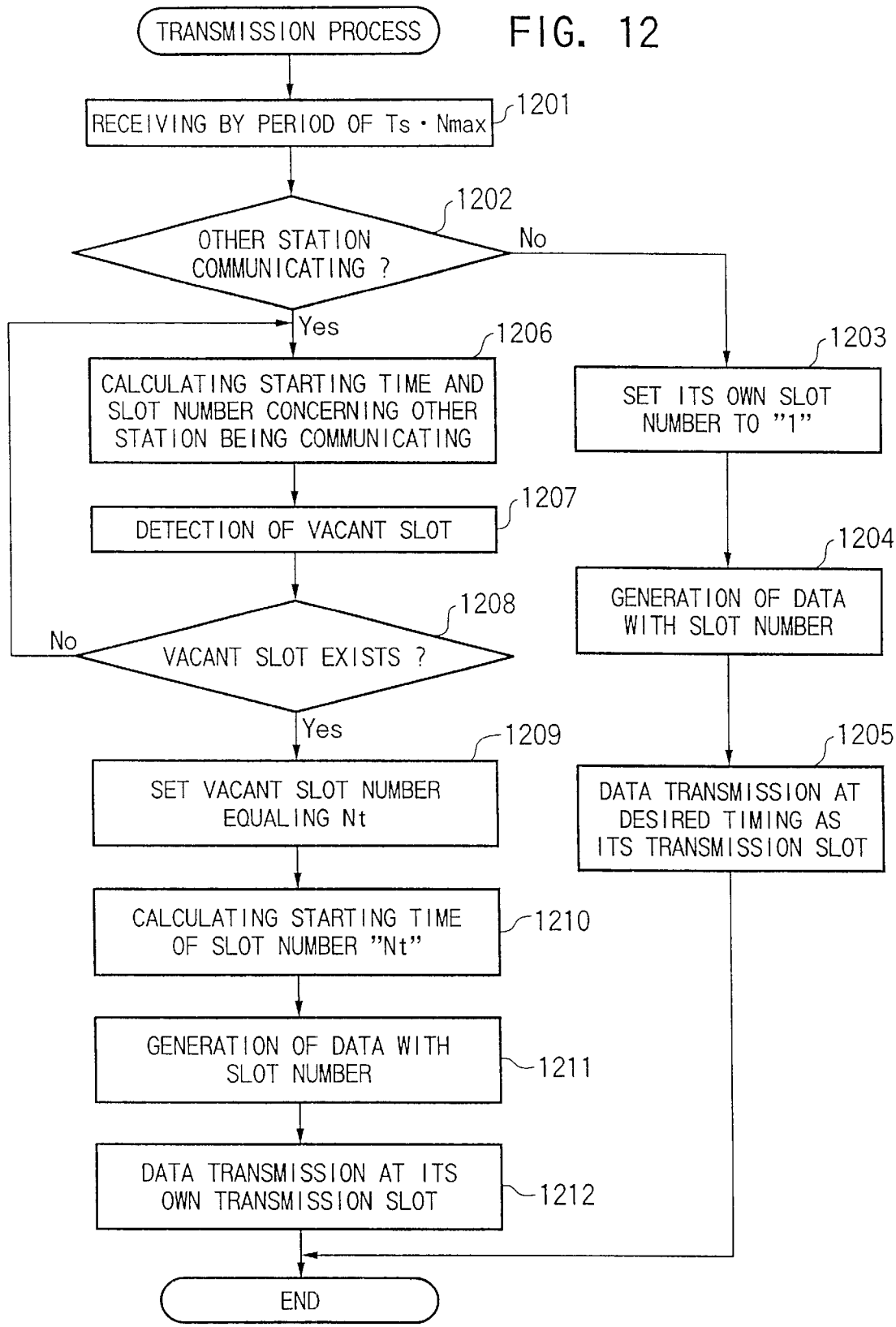
FIG. 12 is a flowchart showing transmission processing operations executed by a radio communication station in the radio communication system according to a fourth embodiment.

FIG. 12 is a flowchart which shows transmission processing operations executed by a radio communication station in the radio communication system according to the fourth embodiment. In this embodiment, as in the third embodiment, the radio communication station first receives s signal for a period of Ts•Nmax (Step 1201). If the control section 102 of the radio communication station determines that no other radio communication station is communicating (No at Step 1202), the control section 102 determines that its own slot number "Nt" equals "1" (Step 1203), and generates the data to be sent to which the determined slot number is added (Step 1204). The control section 102 then sets a desired time as a starting time and transmits the data to be sent generated at Step 1204 in the slot "Ts" (Step 1205). In other words, the data to be sent, to which the slot number is added, are transmitted to the destination radio communication station every slot "Ts".

Conversely, if the control section 102 determines that any one of other radio communication station is communicating ("Yes" at Step 1202), it determines the transmission starting time and slot number of the other radio communication station that it communicating (Step 1206). Then, based on the result at Step 1206, the control section 102 detects whether or not a vacant slot exists (Step 1207). If no vacant slot exists ("No" at Step 1208), the processing operation returns to Step 102. On the contrary, if the vacant slot exists ("Yes" at Step 1208), the control section 102 sets the vacant slot number "Ntx" as its own slot number "Nt" (Step 1209). Then, the control section 102 calculates a transmission starting time of its own slot "Ntx" based on the transmission starting time "Trs" concerning one of the other stations that is transmitting (Step 1210). This calculation can be accomplished using the above mentioned equation (1-1) or (1-2).

After the starting time concerning its own slot number is determined while considering the relation to the slot of another station, the control section 102 generates the data to be sent to which the slot number determined at Step 1209 is to added (Step 1211), and transmits the data to be sent generated at Step 1211 at its own slot staring time "Tts" calculated at Step 1211 (Step 1212). According to this, the data to be sent, to which the slot number is added, are transmitted to the destination radio communication station every slot "Ts".

In this embodiment, no own slot number is assigned to the radio communication station in advance, but a slot number is dynamically assigned thereto in response to changes in situation. Consequently, according to this embodiment, even if the number of radio communication stations is larger than the maximum slot number "Nmax", it is possible to appropriately accomplish the communication using the TDMA.

In the fourth embodiment, although the number of the radio communication stations is larger than the maximum slot number "Nmax", the present invention is not limited to this. The number of radio communication stations may be equal to or less than the maximum slot number "Nmax". Furthermore, in this case, the radio communication station may obtain not only one slot but also a plurality of slots (namely, a plurality of slot numbers may be assigned thereto) to accomplish communication using these slots.

Figure 13:
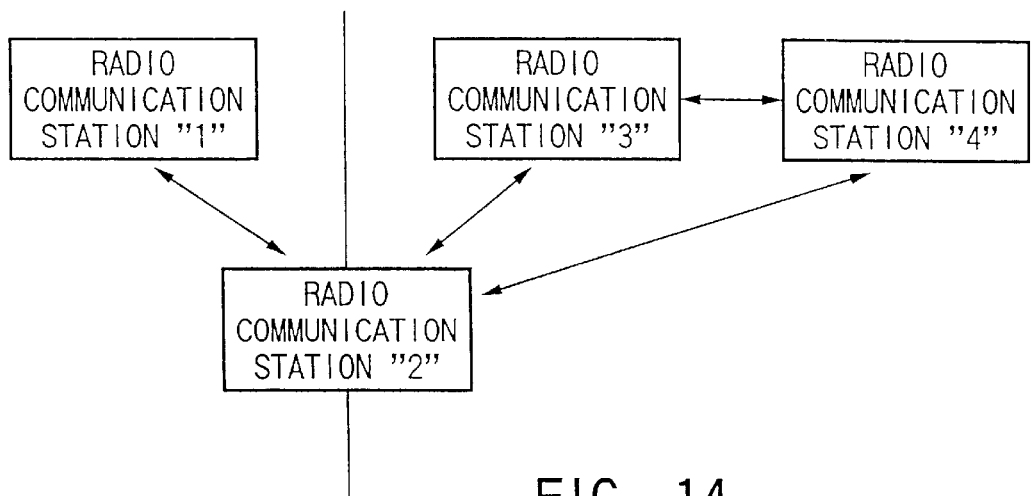
FIG. 13 shows radio communication station according to a fifth embodiment constituting a communication system, and slot numbers which the respective radio communication stations use.
Figure 14:
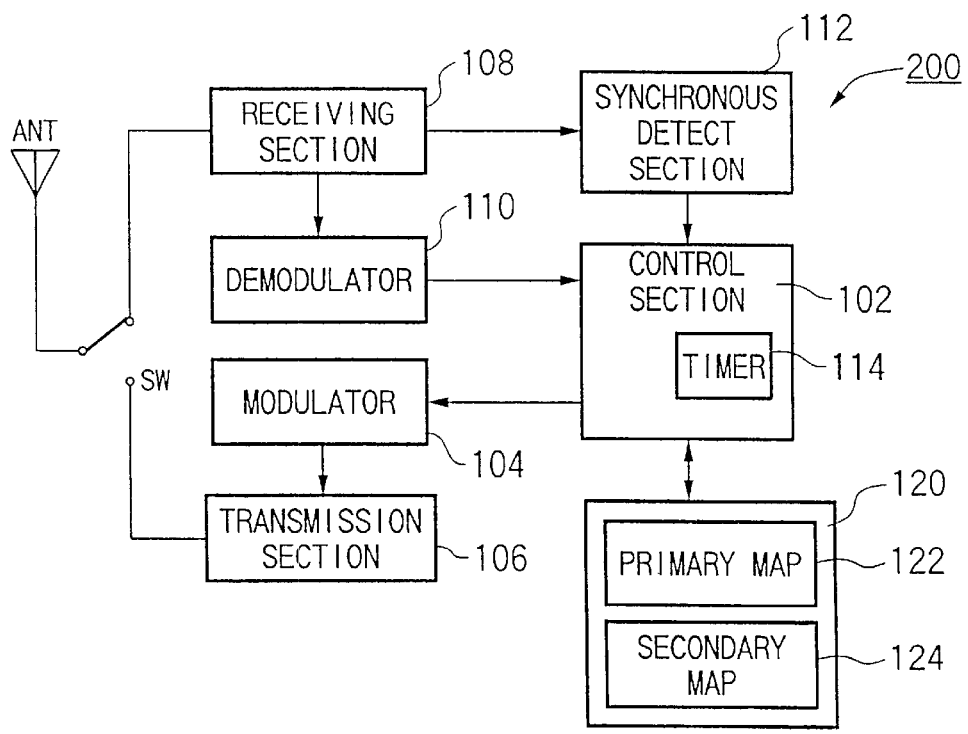
FIG. 14 is a block diagram of a radio communication station according to a fifth embodiment.
Figure 21:
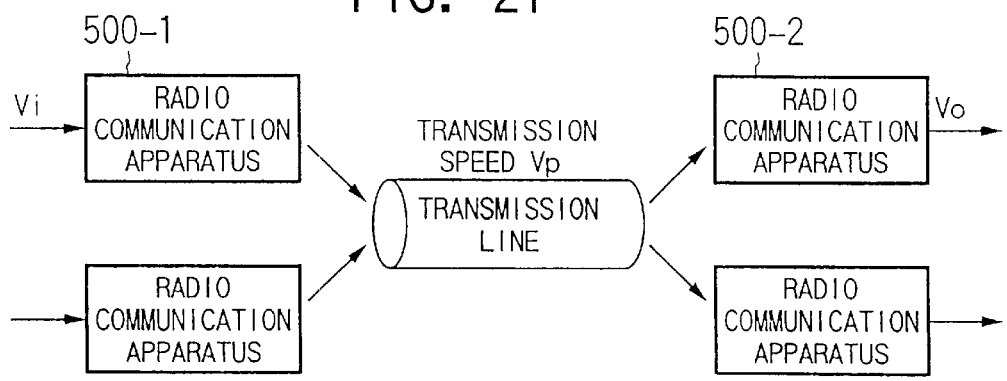
FIG. 21 shows transmission speed of information in a radio communication apparatus and a circuit line according to the present invention.

A fifth embodiment of the present invention will now be explained. One radio communication station can sometimes not communicate with other radio communication stations. For example, the former may be located in a particular building, and therefore it can only communicate with selected radio communication stations. Now assume that, as shown in FIG. 13, a radio communication station "1" can communicate with a radio communication station "2" but can not communicate with radio communication stations "3" and "4". On the other hand, the radio communication stations "3" and "4" can not communicate with the radio communication station "1". In this situation, if the radio communications "3" and "4" are communicating with each other, the radio communication station "1" can not recognize it. Therefore, similarly to the method used in the fourth embodiment, the radio communication station "1" may use a time slot which the radio communication station "3" or "4" is using. If so, in the radio communication station, the transmitting time concerning the radio communication station "1" overlaps the transmitting time concerning the radio communication stations "3" and "4", which causes a collision between them. In view of the above, the fifth embodiment proposes a way of avoiding this. FIG. 14 is a block diagram of a radio communication station according to the fifth embodiment. In FIG. 14, the same numbers are given to the same features shown in FIG. 10. A radio communication station 200, in addition to the radio communication station shown in FIG. 10, is provided with a memory map 120 having a primary map 122 and a secondary map 124. Here, the primary map 122 is a list of slot numbers used by other radio communication stations which the radio communication station can directly communicate with, and the secondary map 124 is an "OR" list of the primary maps of the other stations.

FIG. 15 shows the primary and secondary maps. In FIG. 15(a), circles (e.g. 200-1, 200-1) are indicative of radio communication stations, and the numbers therein indicate the slot numbers which the respective radio communication station are using. Arrows (e.g. AA, AB) between the radio communication stations mean that radio communication stations positioned at both ends can directly communicate with each other. Suppose that a radio communication station "X" ("X" is drawn in a circle) intends to newly find an available slot so as to appropriately carry out communication using the TDMA without any collision. In FIG. 15(a), it can be understood that the primary map of radio communication station 200-2 is constituted by slot numbers 5 and 6 ({5,6}), and that of radio communication station 200-3 is constituted by slot numbers 3, 4 and 6 ({3,4,6}).

Figure 16:
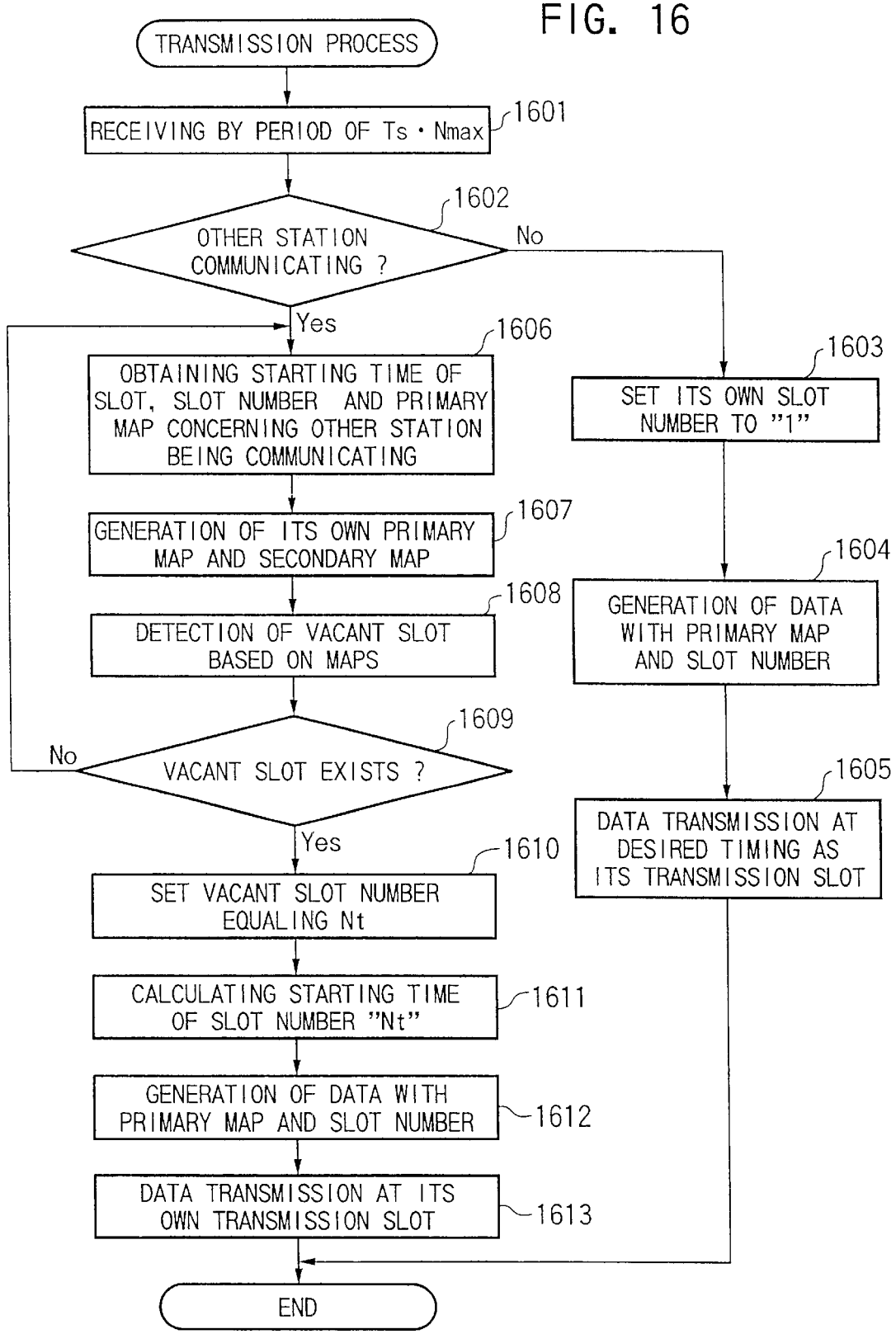
FIG. 16 is a flowchart showing transmission processing operations executed by the radio communication station in the radio communication system according to the fifth embodiment.

FIG. 16 is a flowchart showing transmission processing operations executed by the radio communication station in the radio communication system according to the fifth embodiment. The radio communication station according to this embodiment transmits data indicative of its own primary map as well as the slot number and the data body in its own time slot.

Similarly to the third and fourth embodiments, the radio communication station 200 first receives a signal for a period, namely Ts•Nmax (Step 1601). If the control section 102 determines that no other radio communication station, which can directly communicate therewith, is communicating ("No" at Step 1602), the control section 102 sets its own slot number "Nt" equal to 1 (Step 1603), and generates its own primary map (in this case, indicative of vacant or null) and the data to be sent to which the data indicative of its slot number are added (Step 1604). The control section 102 then transmits the data to be sent generated at Step 1604 in the slot "Ts" (Step 1605).

Conversely, if the control section 102 determines that any one of other radio communication stations, which can directly communicate therewith, is communicating ("Yes" at Step 1602), the control section 102 calculates the transmission starting time concerning all other station communicating and picks out the other stations' slot numbers and primary maps (Step 1606). Then the control section 102 generates its own primary map based on the picked out slot numbers and its own secondary map based on the received primary maps (Step 1607).

The control section 102 generates a sum list of the generated primary and secondary lists to obtain the slot numbers which affects other stations so as to select one of the other numbers which does not affects others (Step 1608).

Figure 15A:
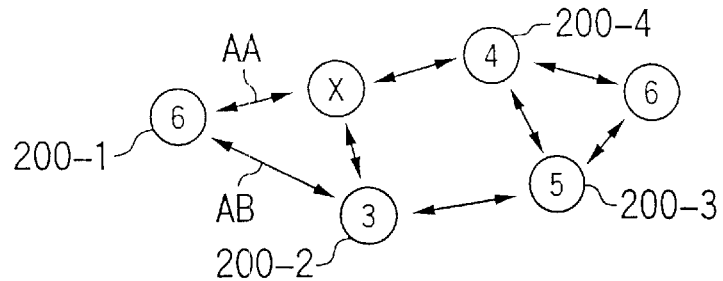
FIG. 15 shows primary and secondary maps according to the fifth embodiment.

For example, the radio communication station "X" shown in FIG. 15(a) obtains slot numbers 3, 4 and 6 at Step 1606, and therefore generates its own primary map constituted by elements {3,4,6}. On the other hand, the primary map of radio communication station 200-1 using the slot number "6" is constituted by an element {3}, the primary map of radio communication station 200-2 using the slot number "3" is constituted by element {5,6} and primary map of radio communication station 200-4 using the slot number "4" is constituted by elements {5,6}. Accordingly, the secondary map of radio communication station "X" is the "OR" of elements in the obtained primary maps, namely it constituted by elements {3}+{5,6}+{5,6}={3,5,6}.

Assume now that the fact that maximum slot number equals 6 is known to every radio communication station in advance. The control section 102 of radio communication station "X" reviews its own first map constituted by elements {3,4,6} and secondary map constituted by elements {3,5,6} to find out that the slot numbers which affect other stations are 3, 4, 5 and 6 ({3,4,6}+{3,5,6}={3,4,5,6}) and, as a result, to find out that the available slot number is "1" or "2". In this way, it is possible to use a slot having a number which does not affect other stations.

Figure 15B:
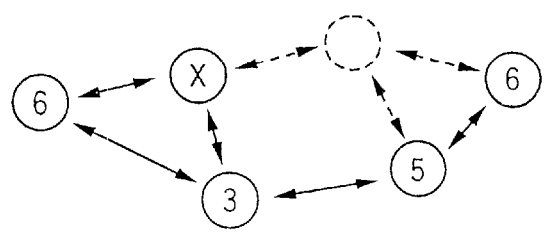

Alternatively, if the radio communication station 200-4 is not communicating (i.e. the radio communication station "X" does not receive a signal from the radio communication station 200-4) as shown in FIG. 15(b), the primary map of radio communication station "X" is constituted by elements {3,6}. In addition, the primary map of radio communication station 200-1 using the slot number "6" is constituted by an element {3}, and the primary map of radio communication station 200-2 using the slot number "3" is constituted by elements {5,6}. Accordingly, the secondary map of radio communication station "X" is constituted by elements {3,5, 6}. Therefore, the slot numbers which affect other stations are 3, 5 and 6 ({3,6}+{3,5,6}={3,5,6}). As a result it can be found that the available slot number is "1", "2" or "4".

If there is no vacant slot ("No" at Step 1609), the processing operation returns to Step 1606 and the operations from Step 1606 to 1609 are repeated until the communication concerning the other station is completed. On the contrary, if there is any vacant slot ("Yes" at Step 1609), the control section 102 selects one of the vacant slot number "Ntx" as its own slot number "Nt" (Step 1610). Then the transmission starting time concerning the determined slot number is calculated, which can be done in the same way as at Step 1106 shown in FIG. 11 or Step 1210 shown in FIG. 12.

Figure 15C:
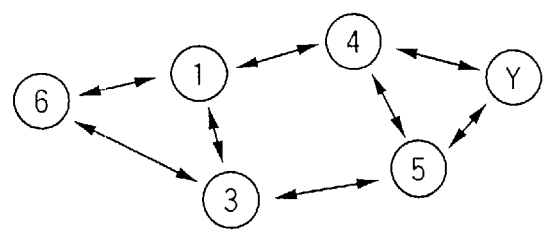

After determining the starting time of its own slot while considering other stations' slots, the control section 102 generates the data to be sent to which the slot number determined at Step 1610 and the primary map generated at Step 1607 are added (Step 1612), and transmits the data to be sent generated at Step 1612 at its own slot starting time "Tts" calculated at Step 1611. According to this, the data to be sent, to which the slot number and primary map are added, are transmitted to the destination radio communication station every slot "Ts". In this regard, when a new radio communication station "Y" intends to communicate with another as shown in FIG. 15(c), the primary map of radio communication station "Y" is constituted by elements {4,5} and the secondary map thereof is constituted by elements {1,3,4,5}. Accordingly the available slot number is "2" or "6". If the radio communication station "Y" uses slot number "6" and transmits data at the corresponding time slot, two radio communication stations 200-1 and "Y" simultaneously transmit data in one radio communication system. However, since there is no radio communication station which can receive both of the above mentioned radio communication stations, no collision occurs.

According to this embodiment, when the radio communication station can directly communicate with other stations which in turn may communicate with still further stations (hereinafter referred to as "secondary stations"), the radio communication station can grasp the slot numbers used by the secondary station by generating the secondary map. It is therefore possible to prevent the use of time slots which affect other stations, namely, to prevent collision or the like.

Figure 15D:
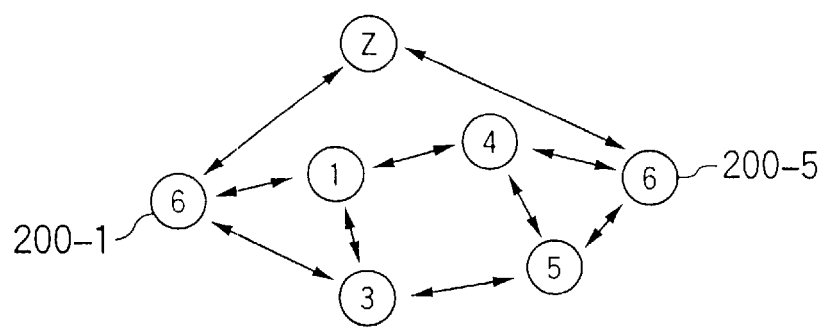
Figure 17:
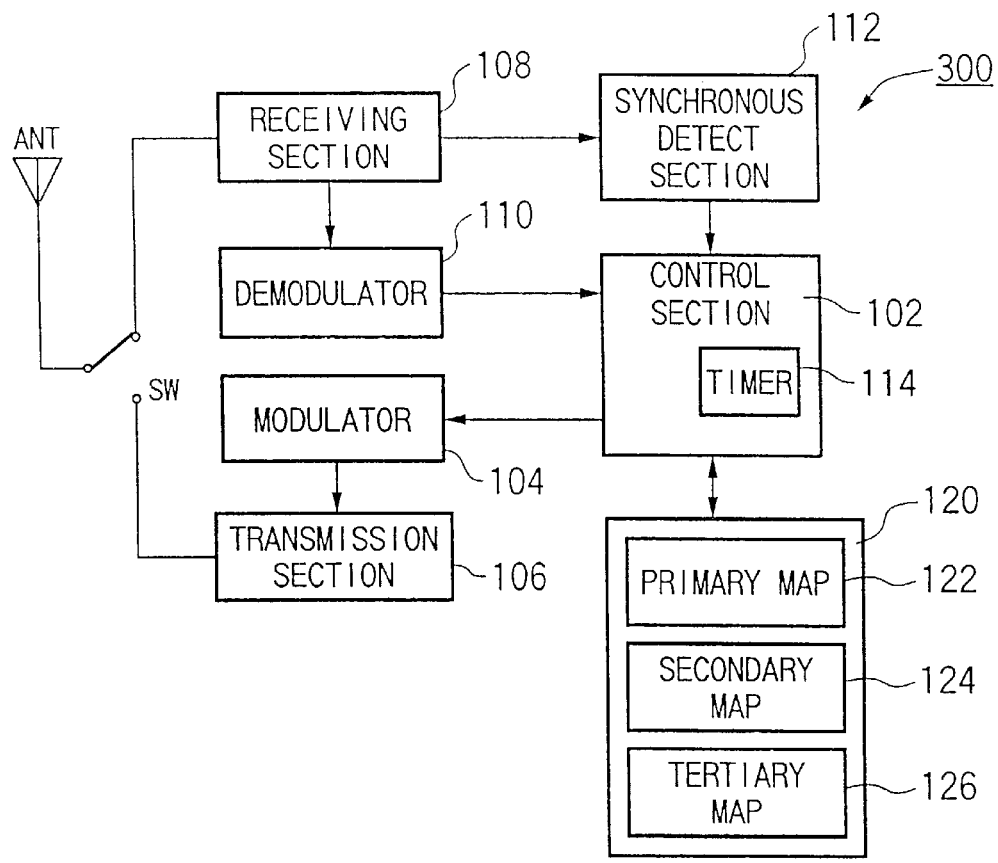
FIG. 17 is a block diagram of a radio communication station according to a sixth embodiment.

A sixth embodiment of the present invention will now be explained. In the fifth embodiment, the radio communication station considers the condition concerning other stations which it can directly communicate with and the secondary stations so as to prevent collision or the like. For example, however, if a new radio communication station "Z" which can communicate with both the radio communication stations 200-1 and 200-5 intends to secure a time slot as shown in FIG. 15(d), collision may occur because the radio communication station "Z" receives two radio signals from two radio communication stations in the same time slot. Accordingly, the radio communication station "Z" can not find out the correct time slot number, which prevents the radio communication system itself from operating appropriately. This problem is solved by generating a tertiary map indicative of slot numbers used in further stations (hereinafter referred to as "tertiary station"), which the secondary stations may communicate with, in addition to the primary and secondary maps. FIG. 17 is a block diagram of a radio communication station according to the sixth embodiment. As can be seen from FIG. 17, in the radio communication station 300 the memory map 120 is constructed such that a tertiary map 126 is added to the memory map of radio communication station according to the fifth embodiment shown in FIG. 14. The tertiary map is a union ("OR" list) of secondary maps concerning other radio communication stations.

Figure 19:
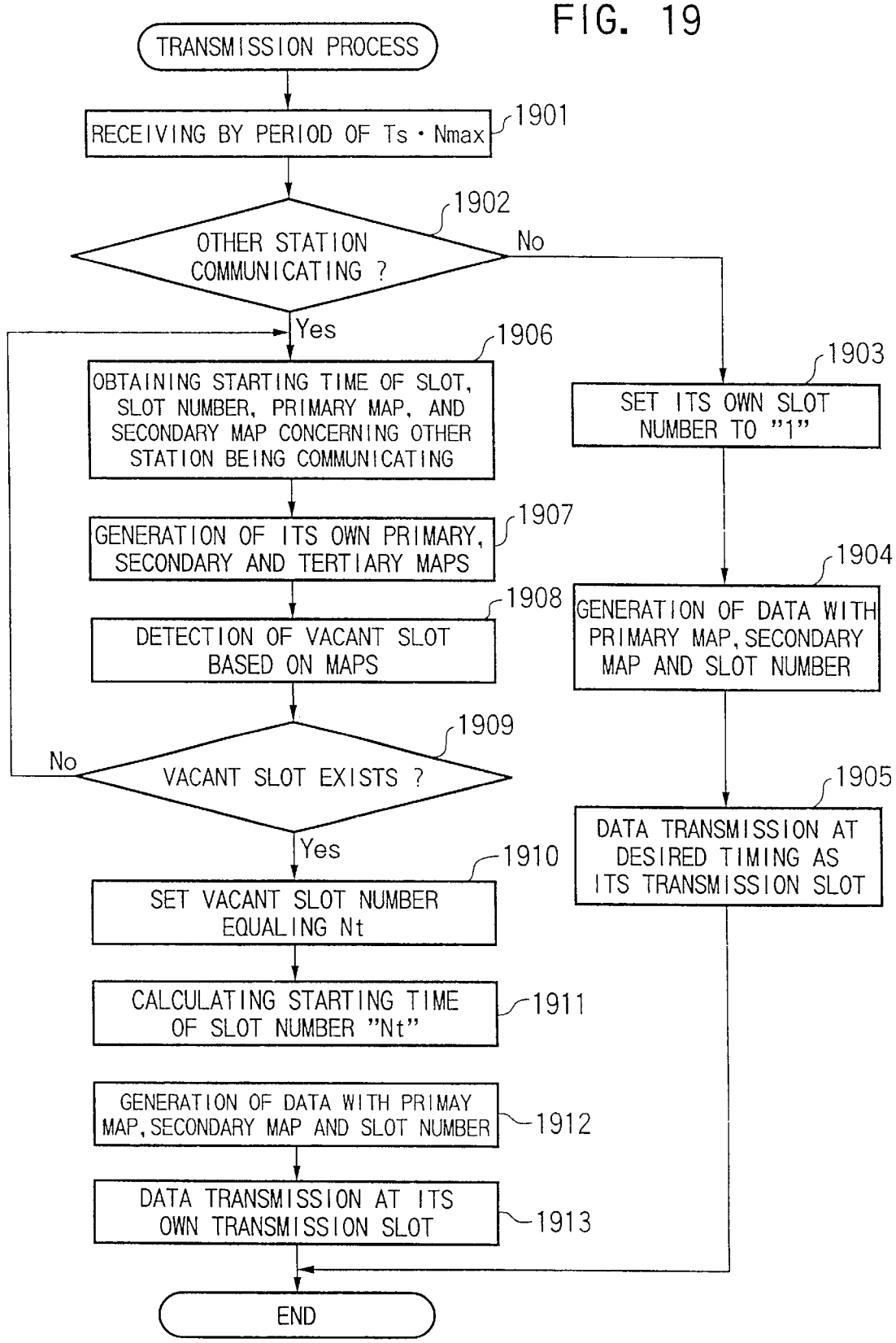
FIG. 19 is a flowchart showing transmission processing operations executed by a radio communication station according to the sixth embodiment.

FIG. 19 is a flowchart showing transmission processing operations executed by the radio communication station according to the sixth embodiment. This flowchart is analogous to that of FIG. 16 except for the fact that the radio communication station transmits its own secondary map in addition to its slot number, data body and primary map.

Steps 1901 and 1902 in FIG. 19 correspond to Steps 1601 and 1602 in FIG. 16. If the result is "No" at Step 1902, the control section 102 sets its own slot number "Nt" equal to 1 (Step 1903), and generates its own primary and secondary maps (in this case, both indicative of vacant or null) and the data to be sent to which the data indicative of the slot number are added (Step 1904). Then, the control section 102 transmits the data to be sent in the slot "Ts" (Step 1905). Conversely, if the result is "Yes" at Step 1902, the control section 102 calculates the transmission starting time concerning all other stations communicating and picks out the other stations' slot numbers and primary and secondary maps (Step 1906). Then the control section 102 generates its own primary map based on the picked out slot numbers, and its own secondary and tertiary maps based on the picked out primary and secondary maps. The control section 102 then generates a union ("OR" list) of the generated primary, secondary and tertiary maps to find out vacant slots.

Figure 18A:
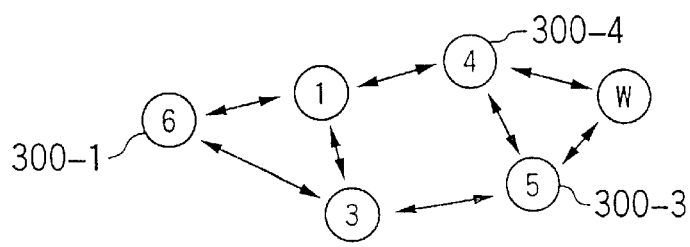
FIG. 18 shows radio communication stations according to the sixth embodiment constituting a communication system, and slot numbers which the respective radio communication stations use.

With regard to a radio communication station "W" shown in FIG. 18(a), it is possible to obtain a primary map constituted by element {4,5}. The primary and secondary maps of radio communication station 300-3 using the slot number "5" are constituted by elements {3,4} and {1,5,6}, respectively. The primary and secondary maps of radio communication station 300-4 using the slot number "4" are constituted by elements {1,5} and {3,4,6}, respectively. In view of the above, the secondary map of radio communication station "W" is constituted by elements {1,3,4,5} (i.e. {3,4}+{1,5}={1,3,4,5}), and the tertiary map thereof is constituted by elements {1,3,5,6} (i.e. {1,5,6}+{3,4,6}={1,3,5,6}). According to this, the slot numbers which should not be used are 1, 3, 4, 5 and 6 (i.e. {1,3,4,5}+{1,3,5,6}={1,3,4,5,6}). Assuming that the maximum slot number equals 6, the only available slot number is 2.

The processing operations (Steps 1909 to 1913) after the detection of vacant slots (Step 1908) substantially correspond to Steps 1609 to 1613 in FIG. 16. In this connection, at Step 1912, the data to be sent, to which the secondary map as well as the slot number and primary map are added, are generated, and the thus generated data are transmitted.

Figure 18B:
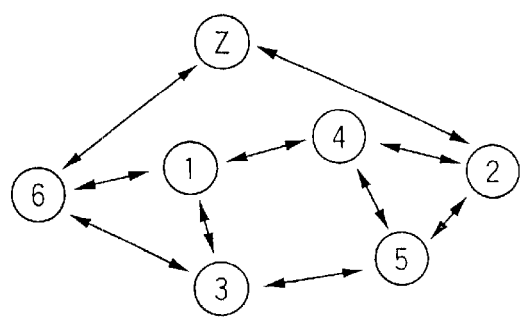

In this way, the tertiary map is generated and the slot numbers used in not only secondary stations but also tertiary stations are grasped, which enables the radio communication system to operate appropriately even if a new radio communication station "Z" intends to secure a time slot as shown in FIG. 18(b).

The cord-less phone apparatus which transmits in such a manner that the data sets each consisting of the preamble and data body repeat using the Direct Spread (DS) as mentioned in the first or second embodiment and uses TDMA as mentioned in the third embodiment will be now explained.

Figure 20:
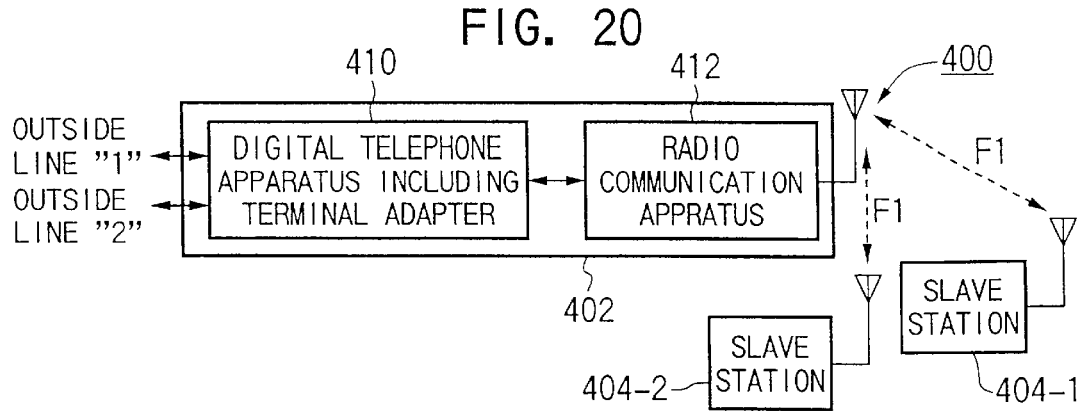
FIG. 20 is a block diagram of a cord-less phone according to a seventh embodiment.

FIG. 20 is a block diagram of a cord-less phone apparatus according to a seventh embodiment. The cord-less phone apparatus 400 can connect with two outside lines (outside lines "1" and "2"), and comprises a master station 402 and a plurality of, for example 2 (two), slave stations 404-1 and 404-2. The master station 402 includes a digital phone apparatus 410 having a terminal adapter (TA) and a radio communication apparatus 412.

The digital phone apparatus 410 makes it possible to connect with other telephone apparatus via a plurality of digital outside lines on the so-called Integrated Services Digital Network (ISDN). The features or aspects of digital phone apparatus 410 are well known, and therefore the detailed description will be omitted. The features of radio communication apparatus 412 or each slave station 404-1, 404-2 are substantially the same as the radio communication apparatus shown in FIG. 10. Assuming that there are one master station 402 and two slave stations 404-1 and 404-2, at least 3 (three) time slots are needed. Further, for example, it is possible to predetermine that the slot number of master station 402 equals 1, and that those of the slave station 404-1 and 404-2 equal 2 and 3, respectively. Further, the radio communication apparatus 412 and the slave stations 404-1 and 404-2 operate substantially based on the flowchart shown in FIG. 11. If other stations are not communicating, data are transmitted at the desired timing (see (Steps 1103 and 1104), whereas if any one of other stations is communicating, a starting time of its own slot is generated and the data are transmitted at the generated timing (see Steps 1105 to 1108).

According to this embodiment, since the communication between the master station and slave stations can be accomplished using a single frequency (see dotted arrows "F1" shown in FIG. 20), only one radio communication apparatus is required in the master station. Conventionally, in order to accomplish multi-channel cord-less phone communication, lines are secured using FDMA or the like. In other words, since a distinct frequency is assigned to each slave station, it is necessary to provide a plurality of radio communication apparatuses each for slave station and an antenna joint apparatus which connects between each radio communication apparatus and an antenna. Conversely, according to this embodiment, it is possible to do away with the antenna joint apparatus and reduce the number of radio communication apparatuses. Besides, in this embodiment, as long as a sufficient number of slots are prepared in advance, it is possible to easily add slave stations to the system.

Finally, a way to improve the efficiency of line usage in the radio communication system according to the above embodiments will be now explained. If the ability to process information in the radio communication apparatus contained in the radio communication system is known, the originating radio communication apparatus estimates the processing time in the destination radio communication apparatus based on the amount of information which was transmitted just before the estimation and the processing speed in the destination apparatus, and determines the starting time of subsequent transmission.

Generally, if an information generation speed "Vi" in the originating radio communication apparatus 500-1 is at least not less than a generation speed "Vo" in the destination radio communication apparatus and a transmission speed "Vp" through the line is larger than the speed "Vi", it is necessary to provide the destination apparatus 500-2 with a buffer using FIFO or the like. Further, if the capacity of the buffer is not enough because each of the information generation speed "Vi" and transmission speed "Vp" is much larger than the information generation speed "Vo", it is necessary to transmit control information in order to accomplish flow-control between the apparatuses.

In view of the above, in the first and second embodiments, the originating apparatus estimates the process completion time at the destination apparatus and transmits the subsequent data row synchronously with the completion time. In this way, it is possible to avoid transmitting the control information for the flow-control and reduce its share (occupation rate) of a transmission line, which results in improving the efficiency of line usage as a whole. In the third to seventh embodiments, it is possible to avoid transmitting the control information for the flow-control and reduce its share (occupation rate) of a transmission line using the above mentioned way.

The present invention has thus been shown and described with reference to specific embodiments. However, it should be noted that the present invention is in no way limited to the details of the described arrangements but changes and modifications may be made without departing from the scope of the appended claims.

For example, the method and the apparatus described in the first and second embodiments can be applied to every kind of radio communication apparatus using the spread spectrum (SS) techniques. In addition, although in the first and second embodiments, QPSK modulation is used as the primary modulation, the present invention is not limited to this and it is possible to use other modulation methods such as 8-PSK, DPSK, PSK, FSK or the like. Further, it can be understood that, as the PN code series for secondary modulation (spreading), other known series such as M series, Gold code series or the like is used.

Still further, in the third to sixth embodiments, the radio communication apparatus using TDMA and the method described in the first or second embodiment is used. However, it is possible to apply the method or apparatus described in connection with the first or second embodiment to other transmission methods such as FDMA or the like.

On the other hand, in the third to sixth embodiments, the radio communication apparatus need not use the method described in the first or second embodiment. In other words, the signal may be generated as in the conventional radio communication apparatus and the receiving circuit may execute the carrier tracking and/or symbol tracking.

Furthermore, although in the fifth embodiment, the radio communication apparatus uses the primary and secondary maps to ensure a time slot for its own use, whereas in the sixth embodiment, the radio communication apparatus uses, in addition thereto, the tertiary map to ensure the time slot, this invention is not limited to this and it is possible to generate a biquadratic map or more as desired using the above mentioned method.

Moreover, although in the seventh embodiment, the respective slot numbers are assigned to the radio communication apparatus and slave stations in advance, the present invention is not limited to this. For example, the radio communication apparatus and/or slave stations may ensure the available time slots using the method described in the fourth embodiment. Alternatively, the radio communication apparatus and the like may use the primary map and/or the secondary map to ensure the available slots using the method described in the fifth or sixth embodiment.

Further, although in the fourth to sixth embodiments, the starting time of other stations currently communicating is calculated, it is not limited to this and it is possible to calculate a termination time.

Still further, in the present invention, the respective means need not necessarily be physical means and arrangements whereby the function of the respective means is accomplished by software fall within the scope of the present invention. In addition, the function of a single means may be accomplished by two or more physical means and the function of two or more means may be accomplished by a single physical means.

INDUSTRIAL APPLICABILITY

The present invention can be applied to a radio communication system such as a wireless MODEM, wireless LAN (Local Area Network) and the like, and the same including cellular phones and/or mobile terminals. Besides, the present invention can be applied to a digital cord-less phone and/or inter-phone.

What I claim is:

1. A radio communication apparatus using spectrum spread, comprising a transmission circuit which generates modulated signals by use of primary modulation and spreading of data to be sent and a receiving circuit which obtains data by use of de-spreading and demodulation of received signals, the apparatus comprising:

a data divider which divides the data to be sent into a plurality of data rows each having a prescribed length; and a data generator which receives said data rows and generates data sets each including a prescribed preamble and the data row, said transmission circuit repeatedly transmitting the data sets each including the preamble and data row, and said receiving circuit receiving the data sets and capturing a portion of the received signal which corresponds to the preamble to accomplish acquisition, wherein said prescribed length of the data row is determined based on an error between a clock speed or clock frequency used in the transmission circuit and another clock speed or clock frequency which is expected to be used in a destination receiving circuit.

2. A radio communication apparatus as defined in claim 1, wherein said prescribed length of the data row is equal to or less than $Tsyn/(2 \cdot dT)$ where $dT=|1/Ftx-1/Frx|$, $Tsyn=1/Ftx$, Ftx is a clock frequency used in the transmission circuit, and Frx is a clock frequency expected to be used in the destination receiving circuit.

3. A radio communication apparatus as defined in claim 1 and which transmits and receives data in one or more time slots using TDMA, the apparatus comprising:

a time slot number obtain circuit which receives signals and, based thereon, obtains at least one time slot number which is used by other station which is communicating with yet another;

a timer which measures a time concerning the time slot; and a transmission time calculation circuit which calculates a starting time of its own time slot based on the obtained time slot number and the time, wherein said apparatus transmits its own time slot number and the data to be sent at the calculated starting time.

4. A radio communication apparatus as defined in claim 3, said own time slot is assigned in advance.

5. A radio communication apparatus as defined in claim 3, said apparatus further comprising:

a vacant slot detector which finds at least one vacant slot number based on the obtained slot number, wherein said apparatus is arranged to select its own slot number from among the found vacant slot numbers.

6. A radio communication apparatus as defined in claim 5, said apparatus further comprising:

a primary map which stores a first list indicative of time slot numbers of other stations which are communicating with another; and a secondary map which stores a second list indicative of time slot numbers used by secondary stations, said secondary stations being further stations which said other stations recognize as being communicating, and said time slot numbers of secondary stations being obtained and transmitted to the apparatus by said other stations, wherein said vacant slot detector finds the vacant slot number based on the first and second lists in the primary and secondary maps.

7. A radio communication apparatus as defined in claim 6, said apparatus further comprising:

a tertiary map which stores a third list indicative of time slot numbers used by tertiary stations, said tertiary stations being still further stations which said secondary stations recognize as being communicating, and said time slot numbers of tertiary stations being obtained and transmitted to the apparatus by said secondary stations via said other stations, wherein said vacant slot detector finds the vacant slot number based on the first, second and third lists in the primary, secondary and tertiary maps.

8. A communication method of TDMA for communicating with other stations via a telecommunication network using a radio communication apparatus as defined in claim 1, the method comprising the steps of:

receiving signals of a cycle period;

determining whether or not other stations are communicating with another;

if at least one of the other stations is communicating with another, measuring a time and a number concerning a time slot used by said one of other stations;

calculating a starting time of its own time slot based on the obtained time slot number and the time; and transmitting the own time slot number and data to be sent at the calculated starting time.

9. A digital cord-less phone comprising a master handset including a radio communication apparatus as defined in claim 8, and one or more slave handsets each including a radio communication apparatus.

10. A radio communication apparatus using spectrum spread, comprising a transmission circuit including a primary modulator which subjects data to be sent to primary modulation and a spread circuit which subjects the primarily modulated data to the spectrum spread so as to generate and transmit modulated signals, and a receiving circuit which subjects received signals to de-spreading and demodulation so as to restore data, the apparatus comprising:

a buffer which temporarily stores the data to be sent;

an input processor which generates a preamble and outputs it to the primary modulator, and thereafter, reads from said buffer a data row having a prescribed length and outputs it to the primary modulator, wherein the transmission circuit repeatedly transmits data sets each including said preamble and said data row supplied from said input processor, and wherein said receiving circuit receives the data sets and captures a portion of the received signal which corresponds to the preamble to accomplish acquisition, wherein said prescribed length of the data row is determined based on an error between a clock speed or clock frequency used in the transmission circuit and another clock speed or clock frequency which is expected to be used in a destination receiving circuit.

11. A transmitter using spectrum spread, comprising a primary modulator which subjects data to be sent to primary modulation and a spread circuit which subjects the primarily modulated data to spectrum spread so as to generate and transmit modulated signals, the transmitter comprising:

a buffer which temporarily stores data to be sent;

an input processor which generates a preamble and outputs it to the primary modulator, and thereafter, reads from said buffer a data row having a prescribed data length and outputs it to the primary modulator, wherein the transmitter repeatedly transmits data sets each including said preamble and said data row supplied from said input processor, and wherein said prescribed length of the data row is determined based on an error between a clock speed or clock frequency used in the transmission circuit and another clock speed or clock frequency which is expected to be used in a destination receiving circuit.

12. A receiver using spectrum spread which subjects received signals constituted of data sets each including a preamble and a data row having a prescribed length to de-spreading and demodulation so as to restore data, the receiver comprising:

a data capture circuit which receives the signal and captures a portion in the received signal which corresponds to the preamble to accomplish acquisition, wherein said prescribed length of the data row is determined based on an error between a clock speed or clock frequency used in the transmission circuit and another clock speed or clock frequency which is expected to be used in a destination receiving circuit.

13. A method for transmitting data using spectrum spread which is accomplished by a primary modulator which subjects data to be sent to primary modulation and a spread circuit which subjects the primarily modulated data to spectrum spread so as to generate and transmit the modulated signals, the method comprising steps of:

when having to transmit data, generating a preamble and outputting it to the primary modulator; and after outputting the preamble, reading a data row having a prescribed length from a buffer which temporarily stores the data to be sent and outputting the data row to the primary modulator, wherein the data sets each including said preamble the data row supplied from the input processor are repeatedly transmitted, and wherein said prescribed length of the data row is determined based on an error between a clock speed or clock frequency used in the transmission circuit and another clock speed or clock frequency which is expected to be used in a destination receiving circuit.

14. A method for receiving data using spectrum spread, which subjects received signals constructed of data sets each including a preamble and a data row having a prescribed length to de-spreading and demodulation so as to restore data, the method comprising steps of:

accomplishing acquisition using a portion in the received signal corresponding to said preamble; and subjecting a portion corresponding to said data row to de-spreading and demodulation so as to restore data, wherein said prescribed length of the data row is determined based on an error between a clock speed or clock frequency used in the transmission circuit and another clock speed or clock frequency which is expected to be used in a destination receiving circuit.

\* \* \* \* \*

UNITED STATES PATENT AND TRADEMARK OFFICE
CERTIFICATE OF CORRECTION

PATENT NO. : 6,778,586 B1
DATED : August 17, 2004
INVENTOR(S) : Hiroshi Mano

It is certified that error appears in the above-identified patent and that said Letters Patent is hereby corrected as shown below:

Column 8,
Line 7, delete "TXUF" and insert -- TXIF --.
Line 8, delete "TMF" and insert -- TXIF--.

Column 10,
Line 11, delete "Step 601" and insert -- Step 610 --.

Column 19,
Line 24, delete "signal" and insert -- signals --.
Line 31, delete "A" and insert -- The --.
Line 34, delete "Tsyn/(2☐dT)" and insert -- Tsyn/(2●dT) --.
Lines 39, 53, 55 and 61, delete "A" and insert -- The --.

Column 20,
Lines 10 and 22, delete "A" and insert -- The --.
Lines 37 and 38, delete "a radio" and insert -- the radio --.
Line 57, delete "signal" and insert -- signals --.

Column 21,
Lines 21 and 22, delete "signal" and insert -- signals --.

Column 22,
Line 9, delete "the data sets" and insert -- data sets --.
Line 10, delete "the input" and insert -- an input --.
Line 23, delete "signal" and insert -- signals --.

Signed and Sealed this

Fourth Day of January, 2005

JON W. DUDAS
*Director of the United States Patent and Trademark Office*